(12) United States Patent
Kim

(10) Patent No.: US 11,086,396 B2
(45) Date of Patent: Aug. 10, 2021

(54) DEPTH-KEYING OF WEB CONTENT

(71) Applicant: Sony Interactive Entertainment LLC, San Mateo, CA (US)

(72) Inventor: Jason Sungkew Kim, Millbrae, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 0 days.

(21) Appl. No.: 15/619,376

(22) Filed: Jun. 9, 2017

(65) Prior Publication Data

US 2018/0284885 A1 Oct. 4, 2018

Related U.S. Application Data

(60) Provisional application No. 62/480,282, filed on Mar. 31, 2017.

(51) Int. Cl.

| G06T 19/00 | (2011.01) |
|---|---|
| G06F 3/16 | (2006.01) |
| G06F 3/01 | (2006.01) |
| G06F 3/0482 | (2013.01) |
| A63F 13/335 | (2014.01) |
| A63F 13/77 | (2014.01) |
| H04N 13/344 | (2018.01) |
| G06F 3/0484 | (2013.01) |
| G06Q 30/06 | (2012.01) |

(52) U.S. Cl.
CPC .......... *G06F 3/013* (2013.01); *A63F 13/335* (2014.09); *A63F 13/77* (2014.09); *G06F 3/011* (2013.01); *G06F 3/012* (2013.01); *G06F 3/0482* (2013.01); *G06F 3/04842* (2013.01); *H04N 13/344* (2018.05); *A63F 2300/66* (2013.01); *A63F 2300/8082* (2013.01); *G06Q 30/0641* (2013.01)

(58) Field of Classification Search
CPC ... G06F 3/04815; G06F 3/0482; G06T 19/20; H04N 13/122
See application file for complete search history.

(56) References Cited

U.S. PATENT DOCUMENTS

| 9,086,837 B1* | 7/2015 | Kang | G06F 3/016 |
|---|---|---|---|
| 2001/0030715 A1* | 10/2001 | Tabata | G02B 27/0172 349/15 |
| 2007/0243863 A1* | 10/2007 | Hong | G02B 27/017 455/418 |
| 2011/0093778 A1* | 4/2011 | Kim | G06F 3/041 715/702 |

(Continued)

*Primary Examiner* — Lawrence S Galka
(74) *Attorney, Agent, or Firm* — Penilla IP, APC

(57) ABSTRACT

Methods and systems are provided for enabling a head mounted display (HMD) user to view web content in 3-dimensional views. A computer-implemented method includes accessing a webpage having content items and detecting that the HMD user's field of view is being directed at one or more of the content items. The method further identifies pre-assigned depth values for one or more displayable objects of the content items, wherein the pre-assigned depth values specify an apparent depth that the one or more objects are to be displayed via the HMD. Moreover, the method applies the pre-assigned depth values to the displayable objects for rendering a 3-dimensional view with the displayable objects appearing to the HMD user at a depth corresponding to the pre-assigned depth values.

26 Claims, 15 Drawing Sheets

(56) References Cited

U.S. PATENT DOCUMENTS

| | | | |
|---|---|---|---|
| 2014/0368532 A1* | 12/2014 | Keane | G02B 27/017 345/619 |
| 2015/0022645 A1* | 1/2015 | Bouazizi | H04N 13/122 348/51 |
| 2015/0228121 A1* | 8/2015 | Tsukahara | G06F 3/04817 345/419 |
| 2016/0314100 A1* | 10/2016 | Seo | G06F 16/986 |
| 2016/0370970 A1* | 12/2016 | Chu | G06F 3/04815 |
| 2018/0033184 A1* | 2/2018 | Jin | G06T 15/005 |
| 2018/0033204 A1* | 2/2018 | Dimitrov | G06T 19/006 |

* cited by examiner

DEPTH-KEYING OF WEB CONTENT

CLAIM OF PRIORITY

This application is a non-provisional of U.S. Provisional Patent Application No. 62/480,282, filed on Mar. 31, 2017, entitled "Depth-Keying of Web Content," which is herein incorporated by reference.

FIELD OF THE DISCLOSURE

The present disclosure relates to virtual reality (VR) environment content presented in head mounted displays (HMDs), and methods and system for assigning depth values or depth properties to web content for displaying the objects within the web content to appear at depths or distances according to the depth value or property.

BACKGROUND

Virtual reality (VR) presented through head mounted displays (HMDs) is becoming a more and more popular way for consumers to interact with various types of content. Certain types of VR specific content are capable of producing an illusion of depth for objects within a VR scene, having some objects appearing closer than others. Typically, an illusion of depth may be achieved by providing slightly different images to a user's left and right eye. The differences between the images the left eye sees and the images the right eye sees result in horizontal disparities or parallaxes, which are then processed in the visual cortex of the user to yield a perception of depth and overall 3-dimentionality.

Creating VR content having 3-dimentionality is still a difficult and complex process. As a result, there are certain types of VR accessible content, including webpages and online stores that are lacking in a way to efficiently develop 3D immersive presentation formats of traditionally 2D content. For example, when webpages designed for display on 2-dimensional displays (e.g., computer monitors, tablets, mobile phones, etc.) are viewed on an HMD, they often retain their 2-dimensional properties.

It is in this context that embodiments arise.

SUMMARY

Embodiments of the present disclosure provides for computer-implemented methods for generating VR content in a web browser that is viewable through a head mounted display (HMD) for an HMD user. Embodiments contemplated include operations for accessing a webpage having content items, the content items being selectable in response to a field of view of the HMD user being pointed towards specific ones of the content items. Moreover, some embodiments include operations for detecting that a field of view of the HMD user is being pointed to one or more of the content items of the webpage. The one or more content items may each include one or more displayable objects configured to be displayed in the webpage via the HMD, wherein the one or more displayable objects are associated with respective pre-assigned depth values. It is further contemplated that some embodiments will identify the respective pre-assigned depth values associated with the one or more displayable objects and apply said depth values to the said displayable objects for rendering a 3-dimensional (3D) view of the one or more displayable objects. For these and other embodiments, the 3-dimensional view for the one or more displayable objects will depend upon the pre-assigned depth values.

In another embodiment, a system for rendering a 3-dimensional view of web content is provided. The embodiment includes a left eye display, a right eye display, a network interface for accessing a webpage having displayable objects, and a computing device for processing data associated with the webpage. According to this and other embodiments, the displayable objects will be associated with pre-assigned depth values, and the computing device is configured to process the pre-assigned depth values using a stereoscopy logic, which is able to render a right eye image to be displayed by the right eye display as well as a left eye image to be displayed by the left eye display. In the contemplated embodiment, a 3-dimensional view of the displayable objects will be provided to an HMD user while viewing the right eye display with a right eye and the left eye display with a left eye. Moreover, in some embodiments, it is contemplated that the left eye image and the right eye image will include the displayable objects having been stereoscopically shifted according to their respective depth values.

In another embodiment, a method for assigning depth values to web content is provided. In the contemplated embodiment, the method provides an interface to a client device configured to receive input for assigning depth values for displayable objects of a webpage. Further, the method receives an input corresponding to a depth value that is to be assigned to a displayable object and subsequently assigns the displayable object with the depth value corresponding to the input. In these and other embodiments, the method receives a request to access the webpage, after which data for displaying the webpage is sent to the requesting device. The data for displaying the webpage is contemplated to include the displayable object as well as the depth value assigned to the displayable objects, wherein the displayable object is configured to be displayed in a 3-dimensional view according to the depth value assigned to the displayable object. In certain embodiments, the interface may optionally include a viewing module that is displayed to the client device configured to display the displayable object in a 3-dimensional view according to the depth value that is assigned to the displayable object via the input.

Other aspects of the disclosure will become apparent from the following detailed description, taken in conjunction with the accompanying drawings, illustrating by way of example the principles of the invention.

BRIEF DESCRIPTION OF THE DRAWINGS

The disclosure may best be understood by reference to the following description taken in conjunction with the accompanying drawings in which.

DETAILED DESCRIPTION

Figure 1A:
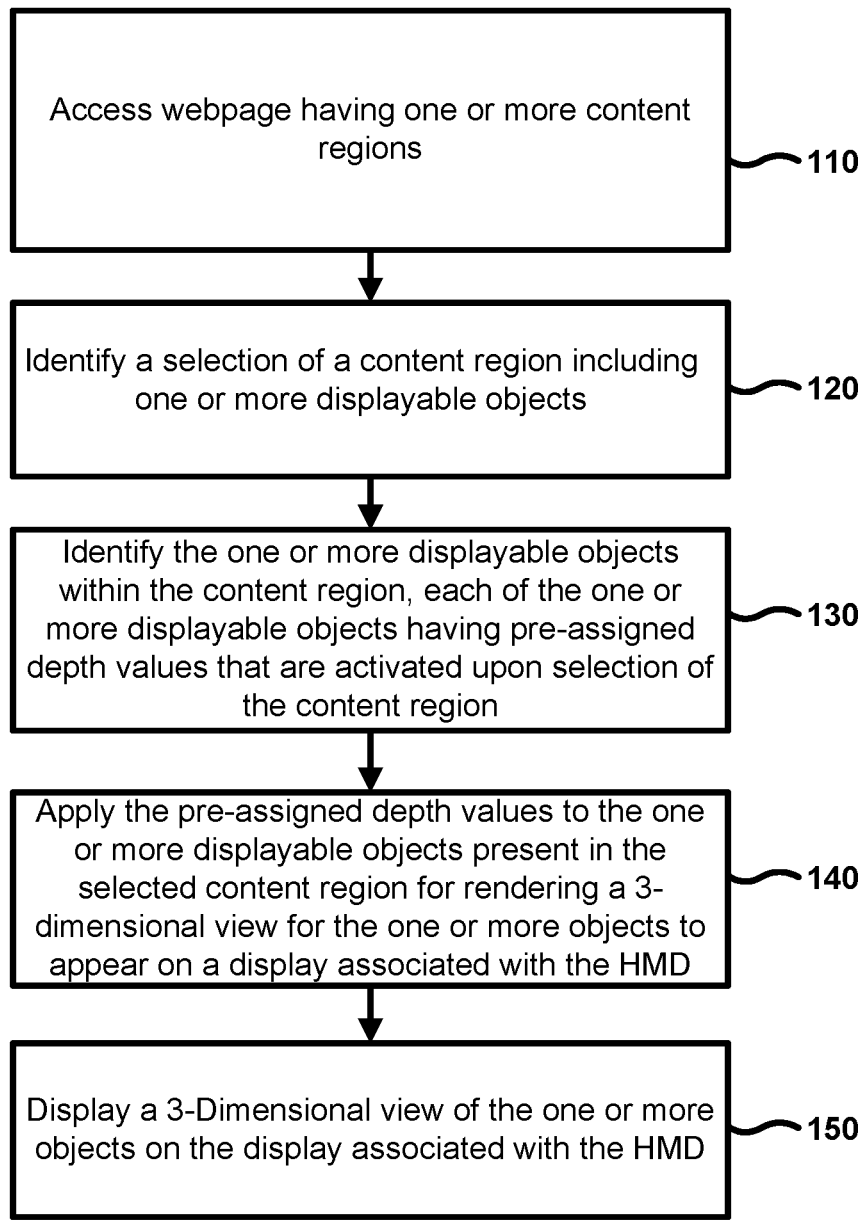
FIG. 1A shows an overall flow of a method for enabling an HMD to display a 3D view of a webpage having objects with pre-assigned depth values.

The following embodiments describe methods, computer programs, and apparatus for enabling a 3D view of web content having content items and/or displayable objects with pre-assigned depth values. It will be obvious, however, to one skilled in the art, that the present disclosure may be practiced without some or all of these specific details. In other instances, well known process operations have not been described in detail in order not to unnecessarily obscure the present disclosure.

Virtual reality (VR) environments provided by HMDs are an increasingly popular medium for consumers to interact with content and for content creators to deliver content to consumers. For example, there are an increasing number of VR-specific games and experiences available to HMD users that provide a fully immersive 3-dimensional environment in which to interact. In addition to 'VR-specific' content, HMDs are often also capable of supporting and displaying traditionally 2-dimensional content, such as webpages and online stores via web browsers. However, when traditionally 2-dimensional content is rendered in an HMD, it will often retain its 2-dimensional properties and appear flat, just as it would on a 2-dimensional display.

Generally, when a homepage of ESPN.com is displayed within an HMD, it will likely appear 2-dimensional because the code (HMTL/CSS) for the homepage is lacking in any depth properties or parameters. As a result, when the ESPN.com homepage is viewed within an HMD setting, the experience is not necessarily any more compelling or immersive than viewing on a computer monitor because the 3D capabilities of the HMD are not being utilized.

Embodiments are provided that enable web developers, content creators, and service providers to provide a 3-dimensional view of web content using familiar web development constructs. These embodiments use methods of assigning or tagging or keying displayable objects within a webpage with a depth value. A depth value assigned to an object will typically cause the object to appear at a certain distance or depth by the HMD user. Generally speaking, depth values can then be processed by a computing device associated with the HMD, which subsequently renders stereoscopic images of the webpage, including the depth-keyed objects, for the left and right eyes. When the user is displayed with the stereoscopic images for his or her left and right eye, he or she will be given the appearance of the objects at certain depths that correlate with the assigned depth values.

Generally speaking, stereoscopy is a technique for creating or enhancing an illusion of depth in images or videos by manipulating stereopsis for binocular vision. HMDs are one of the devices that use stereoscopic methods to create an illusion of 3-dimensional environments for virtual reality scenes. For example, an HMD may present two offset images separately to the left eye and the right eye of an HMD user. The two offset images are then combined by the HMD user's brain to provide a perception of 3-dimensional depth of objects within the images. Also, generally speaking, a greater extent of divergence for a given object between a left eye image and a right eye image correlates with a greater extent of perceived distance. In other embodiments, a shutter system for the user's left and right eye may be used in conjunction with a single display. In these embodiments, the only one of the user's left or right eye is given a view of the screen at any given time, and as a result, images that are displayed on the screen shuffles between a left eye image and a right eye image in synchrony with the shutter system.

Stereoscopic methods are often used for creating 3-dimensional immersive VR scene for 'VR-specific' content, but less so for 'non-VR-specific' content (or, "2-dimensional content"), e.g., content that is also viewable on non-HMD displays such as computer desktops, laptops, tablets, TVs, and mobile phones. Currently, there is no widely available method of converting or modifying traditionally 2-dimensional content to have a 3-dimensional configuration or view within 3D-capable HMDs.

FIG. 1A shows an overall flow of an embodiment of a method for enabling an HMD to display a 3D view of a webpage having objects with pre-assigned depth values. According to the shown embodiment, the method includes an operation 110 for accessing a webpage having one or more content regions. The method then flows to operation 120 for identifying a selection of a content region including one or more displayable objects. Further, the method includes an operation 130 for identifying the one or more displayable objects within the content region, wherein the one or more displayable objects have pre-assigned depth values that are activated upon the selection of the content region. The method then flows to operation 140 in which the pre-assigned depth values are applied to the one or more displayable objects present in the selected content region, wherein applying the pre-assigned depth values renders a 3D view of the one or more displayable objects. Moreover, the method includes an operation 150 in which a 3-dimensional view or configuration of the one or more objects is displayed on the display associated with the HMD.

Generally speaking, a web browser may be used to access webpages for retrieving content to be displayed by the HMD, many of which are designed specifically for the VR environment. Some of these include Samsung® Internet for Gear VR, Mozilla® MozVR, JanusVR, FullDive VR 3D Browser, Oculus® Web Browser, SteamVR Web Browser, etc. In addition to VR-specific web browsers, non-VR browsers may also be used with certain embodiments of the method that enable 3D views of displayable objects within webpages by rendering the displayable objects stereoscopically according to depth values that are assigned to those displayable objects. Some of these web browsers that may be used with the method illustrated by FIG. 1 to access a webpage include Google® Chrome, Mozilla® Firefox, Microsoft® Internet Explorer, Microsoft® Edge, Opera, and the like.

According to certain embodiments, the HMD user may manually input a Uniform Resource Locator (URL) into an address bar associated with a web browser to be directed to desired content. In other embodiments, the HMD user may navigate through web pages via one or more handheld controllers, through voice command detection, or via gaze detection.

In various embodiments, a content region is used to refer to a viewable space within a VR environment that a user may be focused or directed to at any given time. While an HMD is capable of supporting a viewable space that spans 360 degrees (horizontally and even vertically) within a VR environment, the HMD user's field of view is typically roughly 90 horizontal degrees while wearing the HMD. Thus, a user is typically able to actively view a subset of the total available VR content within a typical VR environment. Content regions may vary in size depending on a nature of the content. For example, in some embodiments, a content region may occupy the entire space of a web browser or a page of a web browser (e.g., a rough equivalent of a tab on a web browser being displayed on a 24-inch LCD monitor). In other embodiments, a content region may occupy a subset of a page being displayed in a web browser (e.g., a picture within a tab of a web browser).

When a webpage is accessed by the method of FIG. 1 at operation 110, the webpage will include at least one content region on which a user is to direct his or her field of view, and likely many more. For example, a webpage may have a number of individual stories that may each belong to a different content region. For other webpages, content regions may define different status updates of friends, or articles of a news site, or threads of a forum, and so on. In each of these examples, a user will typically focus or direct his or her attention and gaze to one content region at a time, indicating a selection of the one content region at that time.

Operation 120 of the method of FIG. 1 serves to identify the user's selection of the content region (e.g., what content the user is looking at) automatically. In other words, the HMD user need not explicitly select a content region outside of pointing a field of view towards the content region.

The method shown in FIG. 1A then flows to operation 130, at which one or more displayable objects included by the content region are identified. Displayable objects may include pictures, portions of pictures, videos, portions of videos, text blocks, words, icons, badges, symbols, logos, and so on. For example, if a user accesses the homepage of ESPN.com at operation 110 of the method illustrated by FIG. 1A, the user may direct his or her attention to a content region that includes the "top of the page." A plurality of displayable objects (or simply, 'objects') are likely to be included by the 'top of page' content region of the ESPN-.com homepage, including a headline and accompanying picture, a plurality of articles, links, a navigation panel, a search bar, a live Twitter feed, and so on. According to method of FIG. 1A, operation 130 is capable of identifying these various displayable objects, wherein at least a portion of the various objects have a pre-assigned depth value. According to some embodiments, the pre-assigned depth values of displayable objects are activated upon the selection of the content region made in operation 120.

According to certain embodiments, depth values for a given displayable object may not be activated unless a content region inclusive of the displayable object is selected. Generally speaking, activation serves to render 3D views of the given displayable object only when the user is detected to be looking toward the content region having said displayable object. As a result, 3D rendering resources are allocated for those regions at which the user is detected to be looking, and not to regions at which the user is not currently looking. In other embodiments, however, activation need not happen in order for displayable objects to be rendered according to their depth values. Optionally, de-activation of depth values for displayable objects that are not within the content region that does not coincide with the user's field of view may also occur.

The method shown in the FIG. 1A then flows to operation 140, which serves to apply the depth values pre-assigned to various objects within the selected content region for rendering a 3-dimensional view of the displayable objects. As mentioned above and as will be described in more detail later, rendering the 3-dimensional view of the displayable objects according to their assigned depth values involves stereoscopic processing by a computing device associated with the HMD to render differing left eye images and right eye images. As a result, the displayable objects within the content region are made to appear at distances or depths away from the user. For example, web developers may desire certain objects like the headlining story and accompanying picture retrieved from ESPN.com to appear at a distance or depth that is different from that of other content. Thus, according to these and other embodiments, the web developer may key or assign or tag the headline and accompanying picture for ESPN.com with a certain depth value that is different from respective depth values of other content within the ESPN.com homepage. The method shown in FIG. 1A then flows to operation 150, which displays a 3-dimensional view of the one or more objects after having applied the pre-assigned depth values in operation 140.

Figure 1B:
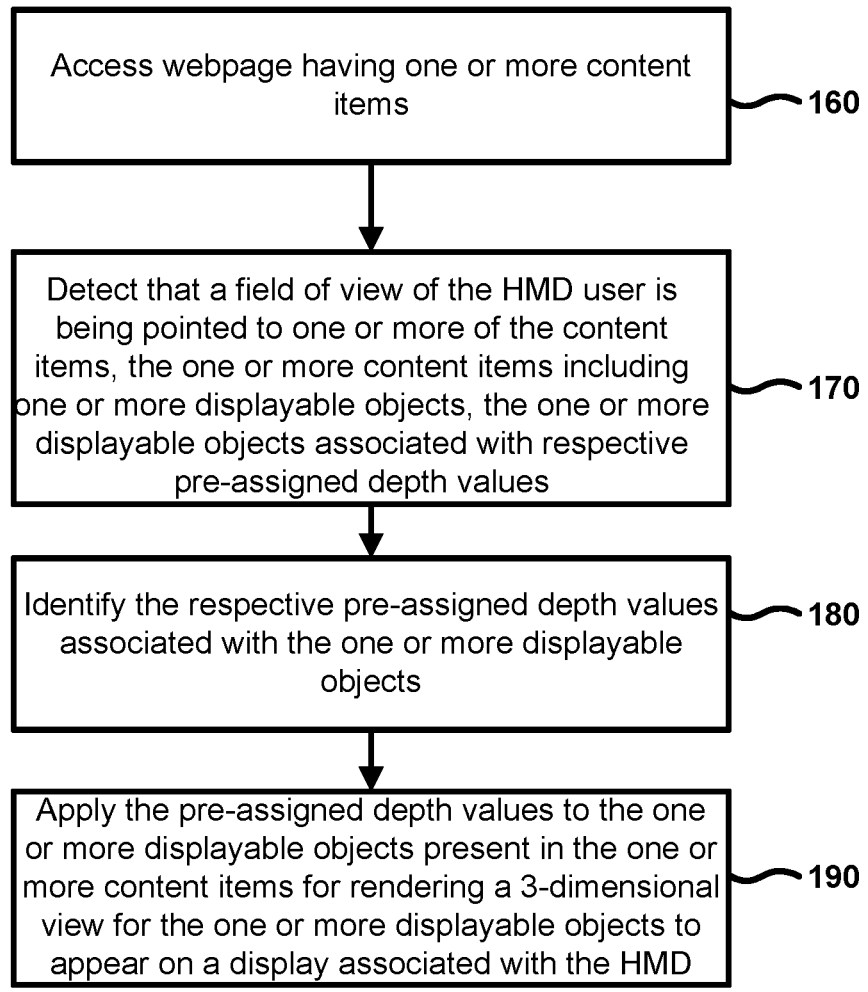
FIG. 1B shows an overall flow of a method rendering a 3-dimensional view of a webpage having content items that include displayable objects with pre-assigned depth values.

FIG. 1B shows an overall flow of a method rendering a 3-dimensional view of a webpage having content items that include displayable objects with pre-assigned depth values. At operation 160 of the method, a webpage is accessed having one or more content items. Generally speaking, content items may include images, stories, posts, text, banners, ads, buttons, links, icons, symbols, avatars, snaps, tweets, videos, live streams, etc. Typically, content items are self-contained regions or spaces of content. For example, if a news website has many individual articles, each article may define a content item. However, if there are compartments or sections within the webpage that includes multiple articles (e.g., 'international news', 'sports', 'money', etc.), each compartment or section may also define a content region, which in turn includes multiple additional content regions defined by the individual articles for each compartment or section.

At operation 170 of the method shown in FIG. 1B, a field of view of an HMD user is detected to be directed towards specific one or more content items, wherein the one or more content items include one or more displayable objects. For example, a content item defined by a headlining story may include a plurality of displayable objects, including a headlining picture, portions within the picture (e.g., a first and second person captured in the headlining picture), as well as the title of the headline, a subtitle, etc. At least a portion of these displayable objects is associated with a pre-assigned depth value.

According to the embodiment shown in FIG. 1B, operation 180 serves to identify those respective pre-assigned depth values associated with the one or more displayable objects. Further, operation 190 of the method functions to apply the pre-assigned depth values to the one or more displayable objects present in the one or more content items for rendering a 3-dimensional view for the one or more displayable objects to appear on a display associated with the HMD.

Figure 2:
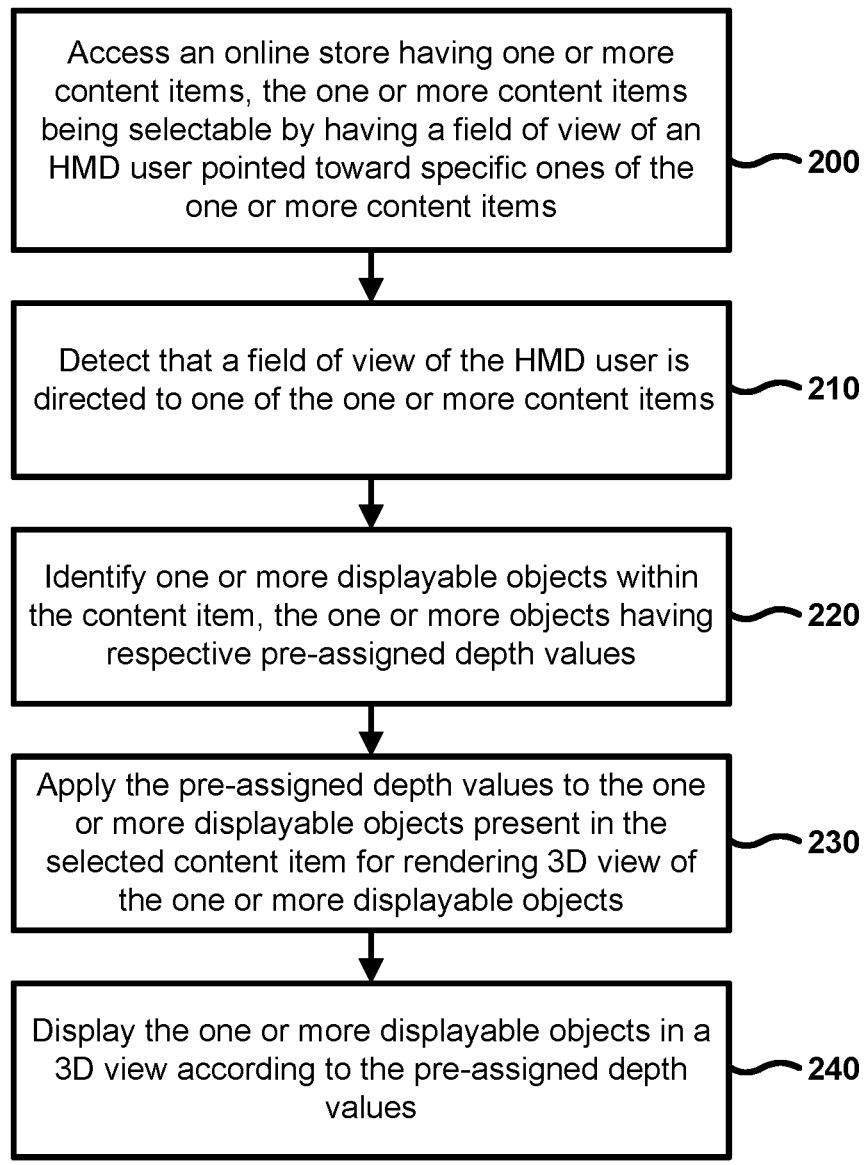
FIG. 2 shows an overall flow of a method for enabling an HMD to display a 3D view of an online store having objects with pre-assigned depth values.

FIG. 2 shows an overall flow of a method for enabling an HMD to display a 3D view of an online store having displayable objects (or simply, 'objects') with pre-assigned depth values. The method includes an operation 200 for accessing online/VR store having one or more content items. According to this and other embodiments, the VR store may include a digital media store, online game store, applications store, and so on. As non-delimiting examples, some of these stores may include the PlayStation® Store, Apple® App Store, Google® Play, Windows® Store, Amazon® Kindle Store, Xbox® Store, HTC® Viveport, Oculus® Experience Store, Samsung® Gear VR Store, or any other Internet-accessible digital store having content for purchase or demonstration.

In various embodiments, the one or more content items may correspond to viewable content entities such as game titles, movie titles, TV shows, applications, music videos, etc. For example, an online/VR store may present several content items that are purchasable, including a plurality of VR game titles, a plurality of movie titles, and a plurality of applications.

According to the embodiment shown in FIG. 2, operation 210 functions to detect that a field of view of the HMD user is directed to one or more of the content items (or simply, 'items') that are accessed in operation 200. Generally speaking, the field of view of an HMD user is continually being tracked by the HMD and associated hardware. For example, the user's field of view may be detected by using a combination of gaze detection data, HMD position and orientation data, inertial data of the HMD, and image capture data from and of the HMD (e.g., front facing camera, and an image capture device facing the HMD and a virtual reality interactive space). Gaze detection data may be obtained by capturing images of one or both of the left and right eyes of a user to determine a direction in which a user is looking. Moreover, HMD position and orientation data may be combined with gaze detection data to obtain more accurate data on the field of view for a user.

In various embodiments of the method shown in FIG. 2, operation 220 of the method serves to identify one or more displayable objects within the one or more items of the online/VR store, wherein the one or more objects have pre-assigned depth values. Generally speaking, each item may include one or more displayable objects such as a picture, a description, a price, one or more clickable buttons (e.g., "buy title", "play demo", "save to wish list", etc.), and so on. At least a portion of these displayable objects will have pre-assigned depth values, which are identified by operation 220 and then applied in operation 230 of the method.

According to certain embodiments, operation 230 of the method shown in FIG. 2 serves to apply the pre-assigned depth values to the one or more displayable objects for rendering a 3D view of the displayable objects. The method then flows to operation 240, in which the one or more items are displayed on a display associated with the HMD, wherein the one or more objects are displayed having 3D view or configuration. For example, according to the method shown, a 3D view of the one or more items of the online/VR store may be displayed to the user, wherein the one or more objects of each of the one or more items are displayed at a depth or distance according to their pre-assigned depth values.

According to some embodiments, depth values may be assigned to the one or more content items in addition to the one or more displayable objects. According to these embodiments, for example, an item featuring a digital product such as a game, movie, or application may be keyed or assigned a depth value such that the content item is displayed within a VR environment at a certain depth or distance corresponding to its depth value. In these embodiments, the one or more displayable objects within the content item may be further keyed with a depth value that will be rendered relative to the depth of the item that is inclusive of the one or more objects. For example, if a content item is assigned a depth value of +1 in arbitrary units, and the content item includes a thumbnail picture (e.g., displayable object) that is also assigned a depth value of +1 in arbitrary units, the method of FIG. 2 may render the item at a distance that corresponds to the depth value of +1 and render the thumbnail picture at a distance that corresponds to the depth value of +1 relative to the item that contains the thumbnail picture. As a result, according to these embodiments, the thumbnail may appear closer (e.g., at a depth of +2) to the HMD user relative to the content item, while the content item may appear closer (e.g., at a depth of +1) to the user relative to other content items of the VR store. In other embodiments, however, the method may render the objects according to an "absolute" scale for depth values, wherein if both the item and the thumbnail have depth values of +1, they will be rendered to appear at the same distance to the HMD user.

For the sake of clarity, it is understood that saying an object appears at a depth corresponding to a depth value of X is equivalent to saying that the object appears at a depth of X.

Figure 3:
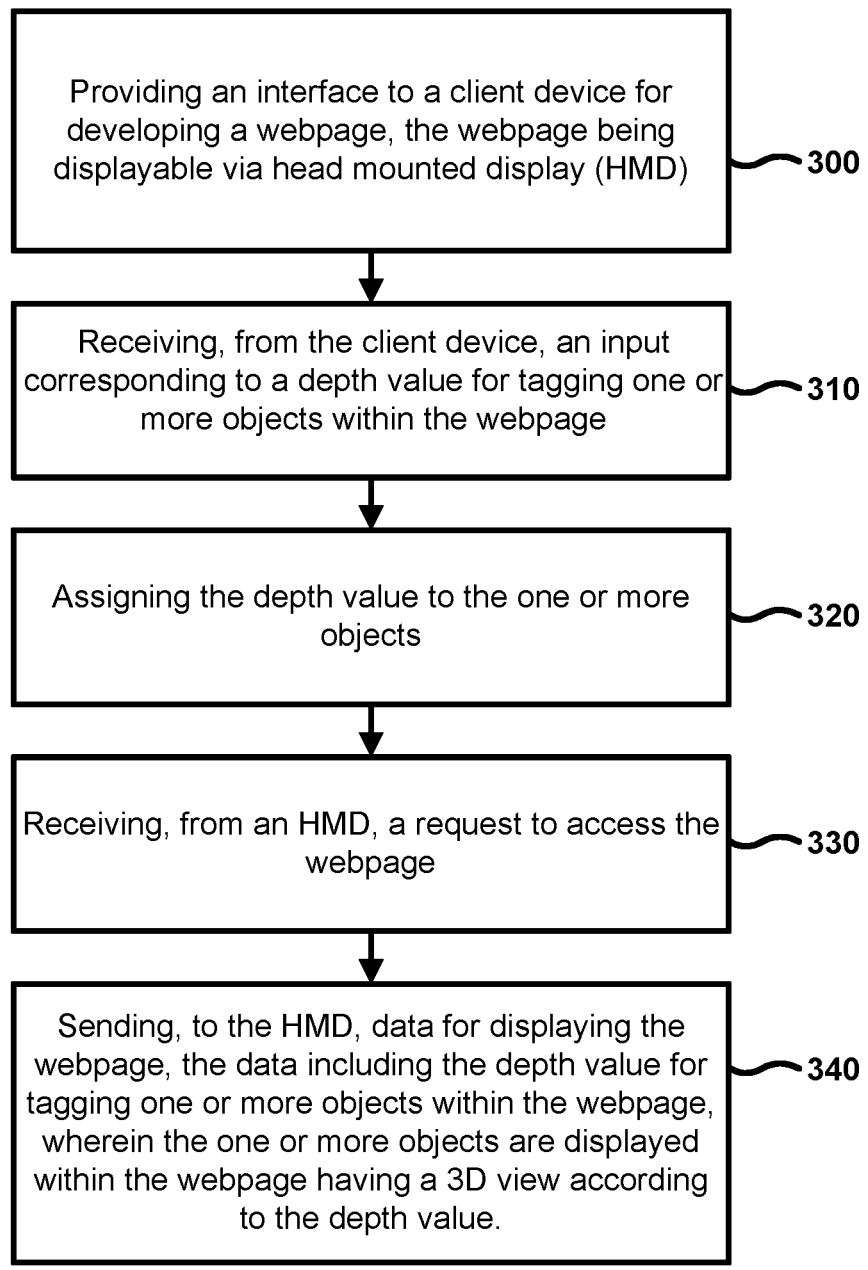
FIG. 3 shows an overall flow of a method for enabling a developer of webpage to assign depth values to displayable objects within the webpage and having those displayable objects displayed at a depth according to their assigned depth values.

FIG. 3 shows an overall flow of a method for enabling a developer of webpage to assign depth values to displayable objects within the webpage and having those displayable objects displayed at a depth according to their assigned depth values. The method includes an operation 300 for providing an interface to a client device for developing a webpage that is displayable via HMD. The interface provided in operation 300 may include an application programming interface (API) that allows a web developer or designer to tag, key, or otherwise assign depth values to displayable objects. In certain embodiments, the interface may include familiar web design constructs such as HTML. In other contemplated embodiments, the interface may include a 'what you see is what you get' (WYSIWYG) editor.

The method shown in FIG. 3 then flows to operation 310, in which an input is received from the client device corresponding to a depth value for tagging one or more objects within the webpage. For example, if a web developer wants a banner to stand out from among the rest of the webpage, he or she may provide an input in the form of a depth value to assign to the banner. According to some embodiments, an arbitrary scale for depth values may be used that spans the integers between −3 and +3, although of course other scales for depth values may be used. According to certain arbitrary scales, positive numbers will indicate that the object is to appear at a depth that is closer to the HMD user, whereas a negative number will cause the object to appear farther away from the HMD user. According to certain embodiments, the magnitude of the depth value will control the extent of or degree of depth for either positive values to appear closer to the HMD user or for negative values to appear farther away from the user.

Generally speaking, a baseline depth value may be used to indicate that no additional depth rendering is to be applied. For example, when web content is normally displayed within a VR environment, it is typically made to appear at a certain distance or depth. This depth or distance may depend on the web browser and/or user preference. As an example, web content that is displayed to a user within a VR environment may appear equivalent to viewing the same content through a web browser that is displayed on a 24 inch LCD monitor from a viewing distance of 4 feet (e.g., the user's eyes are roughly 4 feet from the monitor). This viewing distance may be used as a baseline distance such that a baseline depth value of 0 may cause objects assigned with a baseline depth value to appear approximately 4 feet away. Thus, content within the webpage that is assigned a baseline depth value or is not assigned a depth value will appear at a default baseline distance.

The method of FIG. 3 then flows to operation 320, in which the depth values that are received in operation 310 are assigned to the one or more objects. According to some embodiments, depth values may be assigned to the one or more objects in operation 310 within the same code that is responsible for the rest of the content of the webpage. For example, depth values may be assigned in terms of HTML code.

The method then flows to operation 330, in which a request from an HMD or a computing device associated with the HMD is received to access the webpage. The method also includes an operation for sending, to the HMD, the data for displaying the webpage, the data including the depth values assigned to the one or more objects within the webpage. The data that is sent to the HMD in operation 340 is also configured to have the HMD display a 3D view of the objects within the webpage according to each objects' depth value. As mentioned above, the data that is sent to the HMD in operation 340 may include HMTL code, which may include the assigned depth values from prior operations 310 and 320. In other embodiments, depth values may be assigned, stored, and sent in code that is separate from the code that is used to design a given webpage.

As mentioned earlier, the webpage that is sent in operation 340 of the method of FIG. 3 may be displayed at default or baseline depth. That is, the web browser itself for displaying the webpage may have a default depth value such that it appears at, for example, 4 feet away from the user within a VR environment. Objects that have a depth value assigned to them in operations 310 and 320 may then be displayed according to their depth values relative to the web browser and/or webpage. For example, objects with depth values of +1 may be displayed with a depth such that they appear closer to the HMD user than the web browser and/or webpage, while objects with depth values of −1 may be made to appear at a depth that is farther away than the web browser and/or webpage.

Figure 4A:
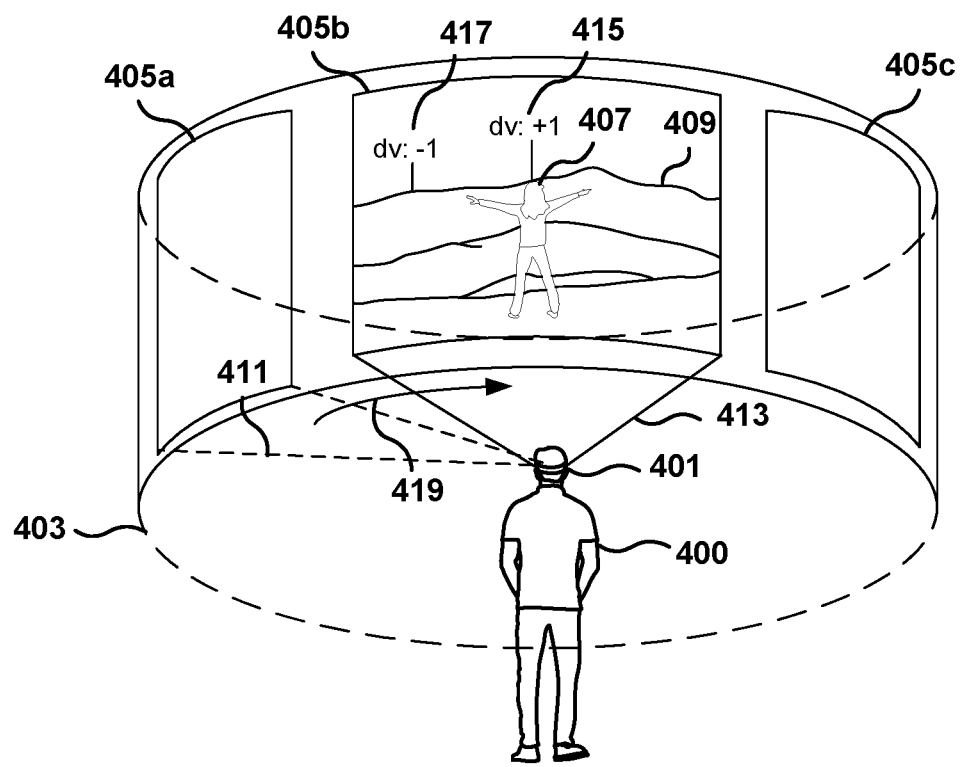
FIG. 4A shows an embodiment of activating depth values assigned to objects within a picture by having a field of view of a user pointed towards the picture.

FIG. 4A shows an embodiment of activating depth values 415 and 417 assigned to objects 407 and 409 (respectively) within a picture 405b by having a field of view 413 of a user 400 pointed towards the picture 405b. According to the embodiment shown, a user 400 is being presented a VR environment 403 that includes a plurality of content regions 405a, 405b, and 405c, each content region featuring a picture. The VR environment 403 may be configured to present content in 360 degrees (e.g., the content surrounds the user 400 in 360 horizontal degrees).

In the embodiment shown in FIG. 4A, the content regions 405a, 405b, and 405c may be a result of a web browser accessing a webpage having each of the pictures within content regions 405a, 405b, and 405c for display. Although each of the pictures of the content regions 405a, 405b, and 405c may be displayed simultaneously within the VR environment 403 by HMD 401, the user 400 typically is only able to view one content region of the web page at a time. For example, the user 400 is shown to have viewed content region 405a before viewing content region 405b.

According to the embodiments shown in FIG. 4A, HMD 401 user 400 proceeds to transition 419 his field of view 411 from being directed at content region 405a to a second field of view 413 that is directed to content region 405b. The transition 419 to the second field of view 413 may, according to certain embodiments, activate depth values 415 and 417 of objects 407 and 409, respectively, within the content region 405b. As a result, woman 407 is shown to have a depth value 415 of +1 while mountain 409 is shown to have a depth value 417 of −1. The user 400 is thus given a 3D view of the picture within content region 405b such that the woman 407 is made to appear closer to the user 400 than the rest of content region 405b, whereas the mountain 409 is made to appear relatively farther away than the rest of content region 405b.

Optionally, any depth values that are assigned to objects within content region 405a may be deactivated when user 400 proceeds to transition 419 his field of view 413 to be directed at content region 405b. Moreover, any depth values that are assigned to objects within content region 405c may not be activated until user 400 further changes his field of view to be directed to content region 405c. Optionally, if user 400 eventually directs his field of view to content region 405c, depth values 415 and 417 for displayable objects 407 and 409 may subsequently be deactivated.

Figure 4B:
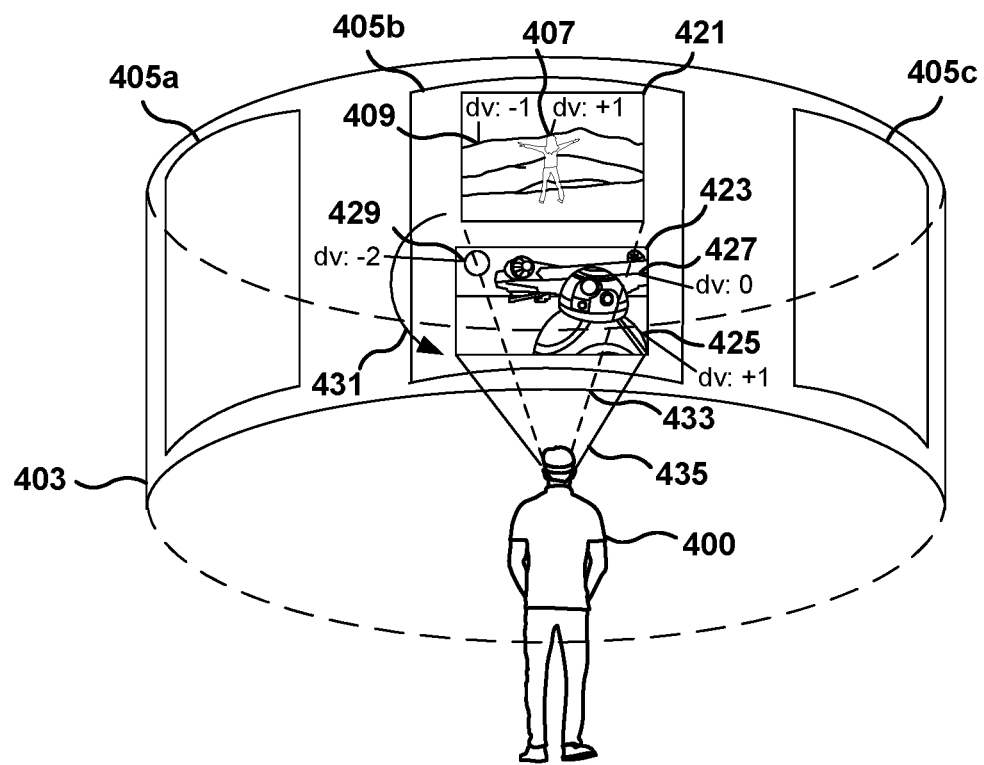
FIG. 4B shows an embodiment of activating a set of depth values for a first picture by having a field of view of a user pointed towards the first picture and away from a second picture.

FIG. 4B shows an embodiment of activating a set of depth values for a first picture 421 and a second picture 423 that are both within a content region 405b. According to the embodiment shown, user 400 is being presented with a VR environment 403 having content regions 405a, 405b, and 405c. Content region 405b is shown to include a first picture 421 of a woman 407 overlooking a mountain range 409 and a second picture 423 of a BB-8 droid 425, a Millennium Falcon 427, and a sun 429. Moreover, user 400 is shown to transition 431 from a first field of view 433 that is directed to the first picture 421 to a second field of view 435 that is directed to the second picture 423.

According to the embodiment shown, the depth values of the displayable objects 407 and 409 may remain activated even though user 400 has made a vertical transition 431 in field of view because the second field of view 435 remains directed to the same content region 405b as the first field of view 433. With some embodiments, maintaining activated depth values associated with the first picture 421 is advantageous even when the field of view 435 of the user 400 is not directed to the first picture 421 at the very instant, because there is a greater likelihood that the field of view of the user 400 will return to the first picture 421. Moreover, since both the first picture 421 and the second picture 423 are within the same content region 405b, it likely that the first picture 421 will be within the a peripheral vision of user 400 when the field of view of the user 400 is directed towards the second picture 423, and vice versa. Thus, it may be a more natural experience to user 400 if all of the objects within a content region are activated according to their depth values.

As shown in FIG. 4B, the user 400 has a second field of view 435 that is directed to a second picture 423 that includes displayable objects BB-8 droid 425, Millennium Falcon 427, and sun 429. Each of these displayable objects has a corresponding depth value that may configure the BB-8 droid 425 to appear to user 400 at a distance that is closer than the Millennium Falcon 427, which in turn appears closer than the sun 429. For example, BB-8 droid 425 is shown to have a depth value of +1, while the Millennium Falcon 427 is shown to have a depth value of 0, and the sun is shown to have a depth value of −2.

As previously mentioned, the content region 405b may have a default depth associated with it such that the region, including the first picture 421 and the second picture 423, are to be displayed within the VR environment 403 having a default or baseline depth (e.g., about 4 feet away from the head of user 400). According to some embodiments, displayable objects with a pre-assigned depth value of 0 will be made to appear at the default or baseline depth (e.g., about 4 feet away from the head of user 400). As a result, the Millennium Falcon 427 may be displayed at the same distance or depth as content region 405b. That is, while BB-8 droid 425 may be made to appear to 'pop-out' of a plane or curved plane that is associated with content region 405b having a baseline depth of 0, the Millennium Falcon 427 may appear to the user 400 to be in the same plane or curved plane associated with content region 405b. Further, the sun 429 may appear to user 400 to be recessed or behind the plane or curved plane associated with content region 405b. For example, if the content region 405b is associated with a depth of 4 feet, BB-8 droid 425 may appear to the user to be only 2 feet away, while the sun 429 may appear to be 16 feet away. Of course, these distances are exemplary and not meant to limit the various embodiments. For example, other embodiments may have a default depth of 2 feet or 10 feet that is associated with content region 405b, wherein the displayable objects will appear at depths relative to the default depth of the content region 405b.

According to the embodiment shown in FIG. 4B, displayable objects 407, 409, 425, 427, 429 that are assigned the same depth value may appear to the user 400 to be at a similar distance away. For example, since woman 407 and BB-8 droid 425 have the same depth value of +1 relative to pictures 421 and 423, respectively, which both have a default depth value of 0, woman 407 and BB-8 droid 425 may be made to appear to the user at the same distance (e.g., in a same or similar plane). If however, picture 423 was assigned a depth value of +1 (with picture 421 having a default depth value of 0), then BB-8 droid 425 may be made to appear closer than woman 407 because of an effective depth value of +2 (sum of picture depth value of +1 and displayable object depth value of +1). In other embodiments, however, the depth values for the picture and the displayable object within the picture need not be additive. For example, in other embodiments, depth values for layers (e.g., picture and object within a picture) may be combined in any number of ways, in addition to being additive.

Figure 5A:
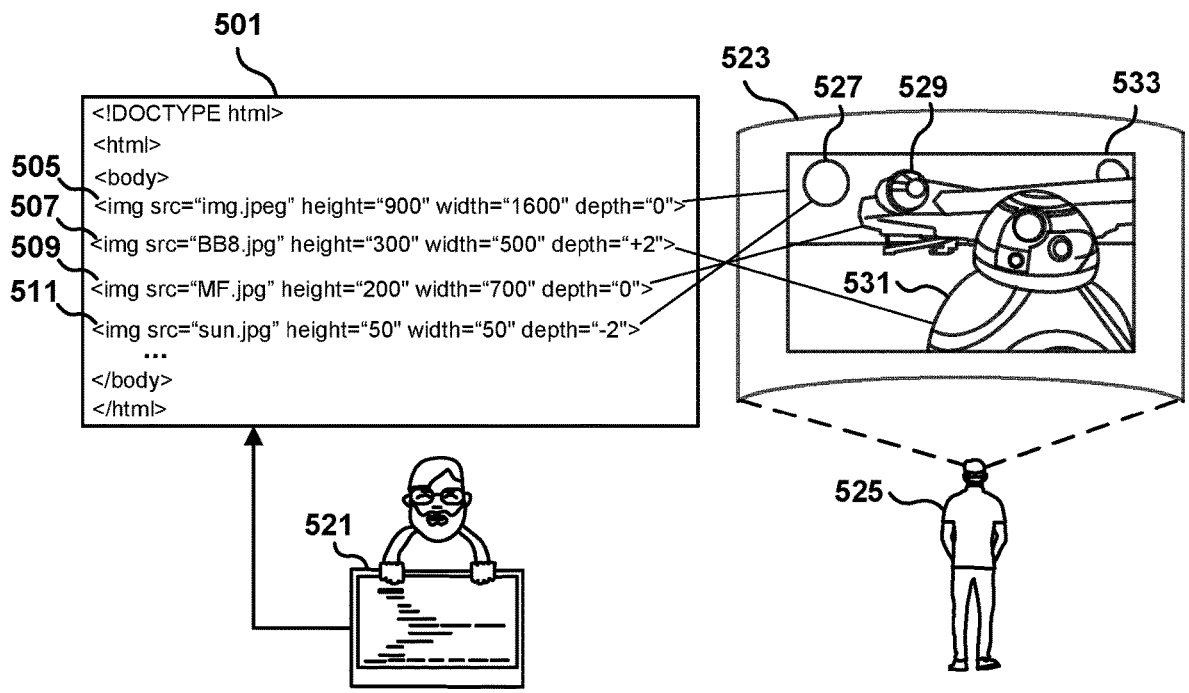
FIG. 5A shows a conceptual scheme for developers to depth key objects within a content item by pre-assigning depth values for the objects in HTML/CSS.

FIG. 5A shows a conceptual scheme that may be used by a developer 521 to depth key objects within an image by pre-assigning depth values for the objects in HTML/CSS, according to some embodiments. As shown in FIG. 5A, HTML code 501 is shown to include HMTL tags 505, 507, 509, and 511. Tag 505 is shown to call up an image 533 to be presented at a depth of 0. Tag 507 is shown to call up an image of BB-8 droid 531 that is to be overlaid on top of image 533 and at a depth of +2. Also shown in FIG. 5A are tags 509 and 511 that call up Millennium Falcon 529 to be displayed at a depth of 0 and a sun 527 to be displayed at a depth of −2, respectively. The resulting VR scene 523 is shown to be displayed to the user 525 having each of the BB-8 droid 531, Millennium Falcon 529, and sun 527 displayed at their respective depths coded for in HMTL code 501. Thus, it is contemplated here that displayable objects may also be coded for by overlaying images on top of each other.

Figure 5B:
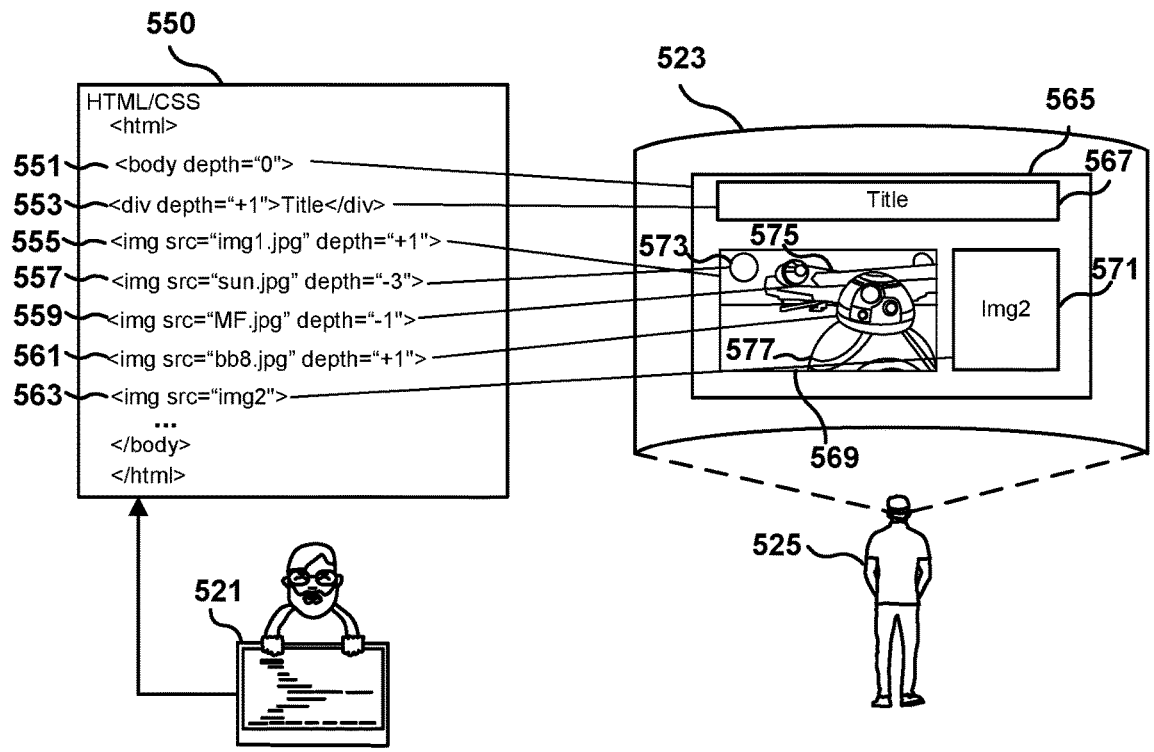
FIG. 5B shows a conceptual scheme for developers to depth-key content items within a content region by pre-assigning depth values for the content items in HTML/CSS.

FIG. 5B shows a conceptual scheme that a developer 521 may use to depth-key content items within a webpage 565 by assigning depth values for the content items in HTML code 550, according to certain embodiments. According to the embodiment shown, HMTL code 550 includes tags 551, 553, 555, 557, 559, 561, and 563 that code for the components shown in webpage 565 being displayed in VR environment 523 to HMD user 525. For example, tag 551 is shown to specify a depth of 0 for the 'body' of the webpage 565. Thus, according to these and other embodiments, a depth property for the background layout of the webpage may be assigned or attributed in a '<body>' tag. However, in other embodiments, depth properties for the background or body of a webpage may be specified using other tags.

Also shown in HMTL code 550 is tag 553, which codes for a depth value of +1 for the title 567 of the webpage 565 in addition to coding for the content of title 567. In other embodiments, a title's depth value of +1 may be coded for using the following language: "<title depth="+1">Title</title>." Thus, it is contemplated here that any tag that defines an area or component on a webpage may be provided with a 'depth' attribute. The depth attributes for tags such as "<img>", "<div>", "<title>", "<dialog>", "<table>", etc., may then be interpreted by the stereoscopic rendering logic to render areas within the webpage associated with each tag to be presented at their respective depth values.

According to the embodiment shown, tag 555, 557, 559, 661, and 563 codes for the first image 569, sun 573, Millennium Falcon 575, BB-8 droid 577, and the second image 571, respectively. First image 569 is shown to be assigned a depth value of +1, while sun 573, Millennium Falcon 575, and BB-8 droid are shown to assigned depth values of −3, −1, and +1, respectively. Moreover, second image 571 is shown to be lacking in a depth attribute and, as a result, may take on a default depth value that may be made equal to the depth value specified by the tag 551 (e.g., <body depth="0">).

According to the embodiment shown, the HMD user 525 is given a 3D view of webpage 565 within VR environment 523 that is defined by HMTL code 550 retrievable via the Internet. It is contemplated that a depth value of 0 may cause a content item or object having said depth value to appear about 4 feet away (viewing distance) from the HMD user 525 in virtual space within the VR environment 523. However, of course, different distances may be used to correspond with a baseline depth value.

For example, an estimation of a depth or distance that corresponds to a baseline depth value (e.g., depth of 0) may be based on natural viewing distances for HMD users to consume or interact with web content. Some of these estimations are based on real world practice, which may indicate that an average person who views web content on a monitor of an average size (e.g., 24 diagonal inches) at a standard resolution (e.g, 1920×1080) via a web browser having a zoom of 100% will tend to position themselves about 4 feet away from said monitor. However, viewing distances may change depending on a size and resolution of display, as well as a zoom or scaling of web content, e.g., by zooming in. For example, a viewing distance may increase by selecting a zoom feature in some web browsers. Moreover, viewing distances may depend on user preference, as well as the type of content (e.g., watching a movie versus viewing Facebook updates), etc. Thus, the estimation of 4 feet for a baseline or default depth that accords with a depth value of 0 may range anywhere from about 1 foot to about 100 feet, depending on user preference, content type, web browser magnification, etc., within an HMD provided VR environment.

Moreover, it is contemplated that in some embodiments, depth values may be additive such that BB-8 droid 577 might have an effective depth value of +2 because BB-8 droid 577 is an image that is overlaid on top of first image 569, which has a depth value of +1. Likewise, Millennium Falcon 575 may have an effective depth value of 0, while the sun is to have an effective depth value of −2. In other embodiments, however, depth values need not be additive.

Figure 6A:
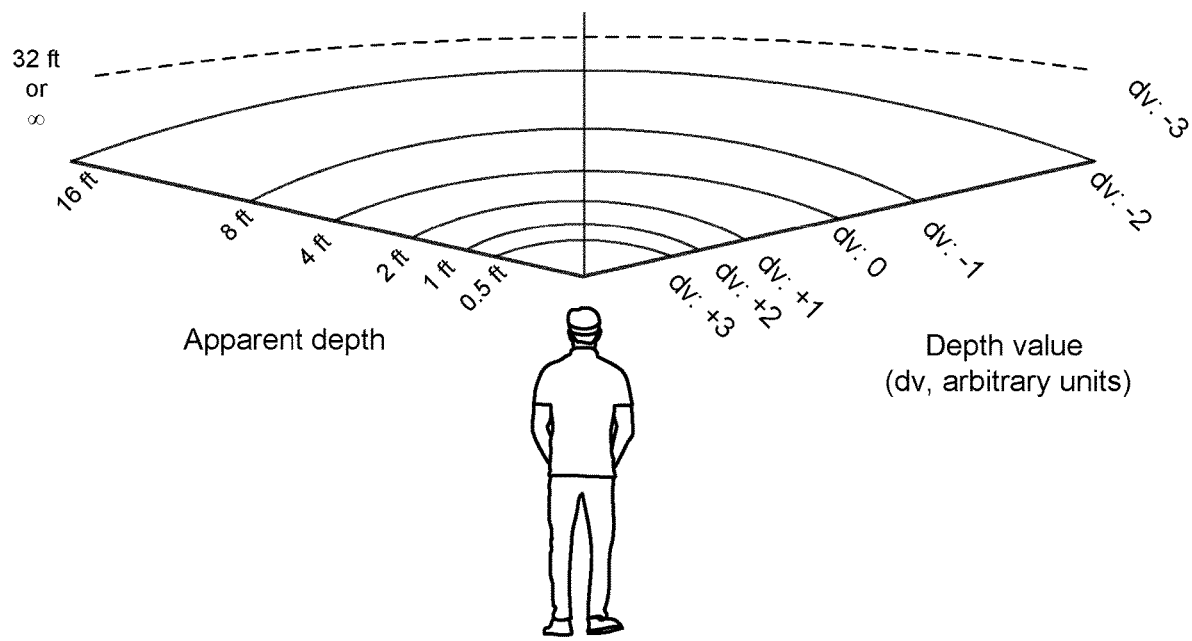
FIG. 6A shows a diagram for how depth values might relate to a distance an object assigned with respective depth values may appear to a user.

FIG. 6A shows an exemplary diagram for how depth values might relate to a distance an object assigned with respective depth values may appear to a user, according to some embodiments. For example, an object or content item having a depth value of +3 may appear to the user to be at a depth of 0.5 ft, while those with a depth value of +2 at 1 foot. At the other end of the range, objects or items having a depth value of −3 may be made to appear at a distance of 32 feet or farther, e.g., at a distance past which objects cannot be stereoscopically differentiated for depth.

According to the embodiment shown in FIG. 6A, a depth value of 0 corresponds to a perceived depth of 4 feet. As previously mentioned, depth values of 0 may indicate a default depth for which content is normally presented to users. Furthermore, according to the embodiment shown, the correlation between depth value and perceived depth may be defined by an exponential relationship, for example:

$$\text{apparent depth} = 2^{-depthvalue+2} \quad (1)$$

Figure 6B:
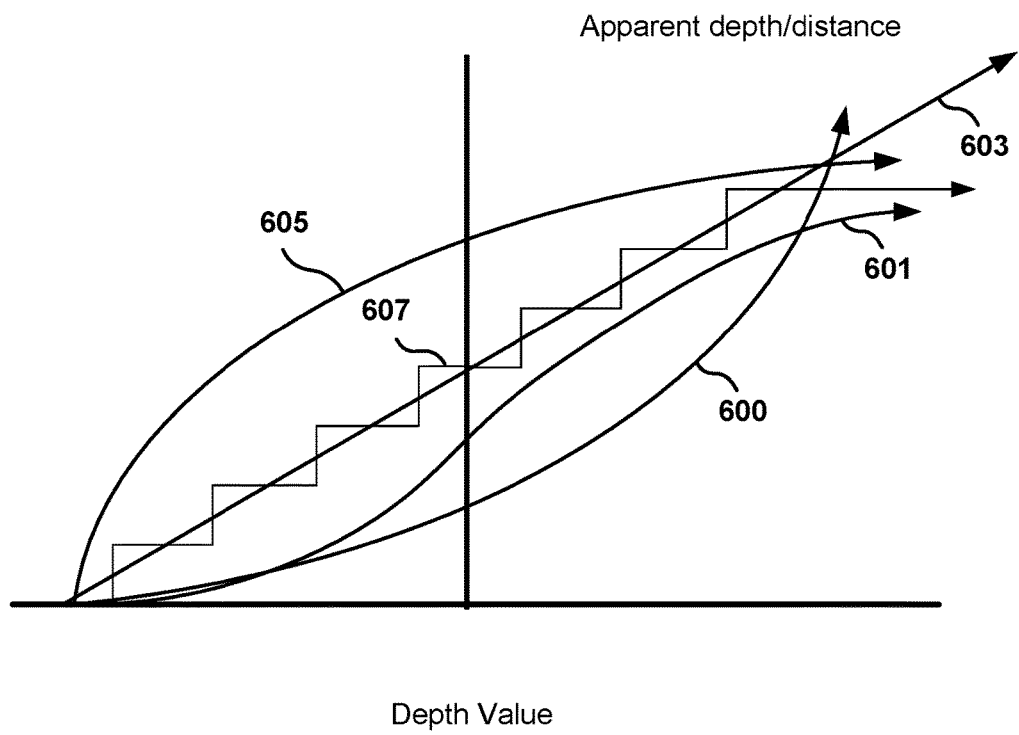
FIG. 6B diagrams several embodiments of the relationships between depth values and the apparent depths/distances of objects having those respective depth values.

The correlation between depth values and apparent depths presented in FIG. 6A is exemplary and not meant to be limiting. There are a number of other relationships between depth value and apparent or perceived depth that do not depart from the scope and spirit of the embodiments described. Some of these are shown in FIG. 6B. Furthermore, although depth values are represented in FIG. 6A and elsewhere by integers, it will be appreciated that any number scale may be used, including those with fractions, only whole numbers, only natural numbers, etc., as long as a relationship or correlation between numbers within the depth value scale and an apparent depth scale is defined.

FIG. 6B diagrams several exemplary embodiments of relationships between depth values and the apparent depths/distances that objects will be made to appear having those respective depth values. For example, curve 600 shows a relationship between depth value and apparent depth that is defined by an exponential function, such as that shown in FIG. 6A. Also shown are sigmoidal curve 601, a linear curve 603, a logarithmic curve 605, and a step function 607. However, as will be appreciated by one skilled in the art, relationships between depth values and apparent depths may be described by any number of functions without departing from the scope and spirit of the embodiments described. Thus, the relationships/curves/functions shown in FIG. 6B are meant to be exemplary and not limiting.

Figure 7:
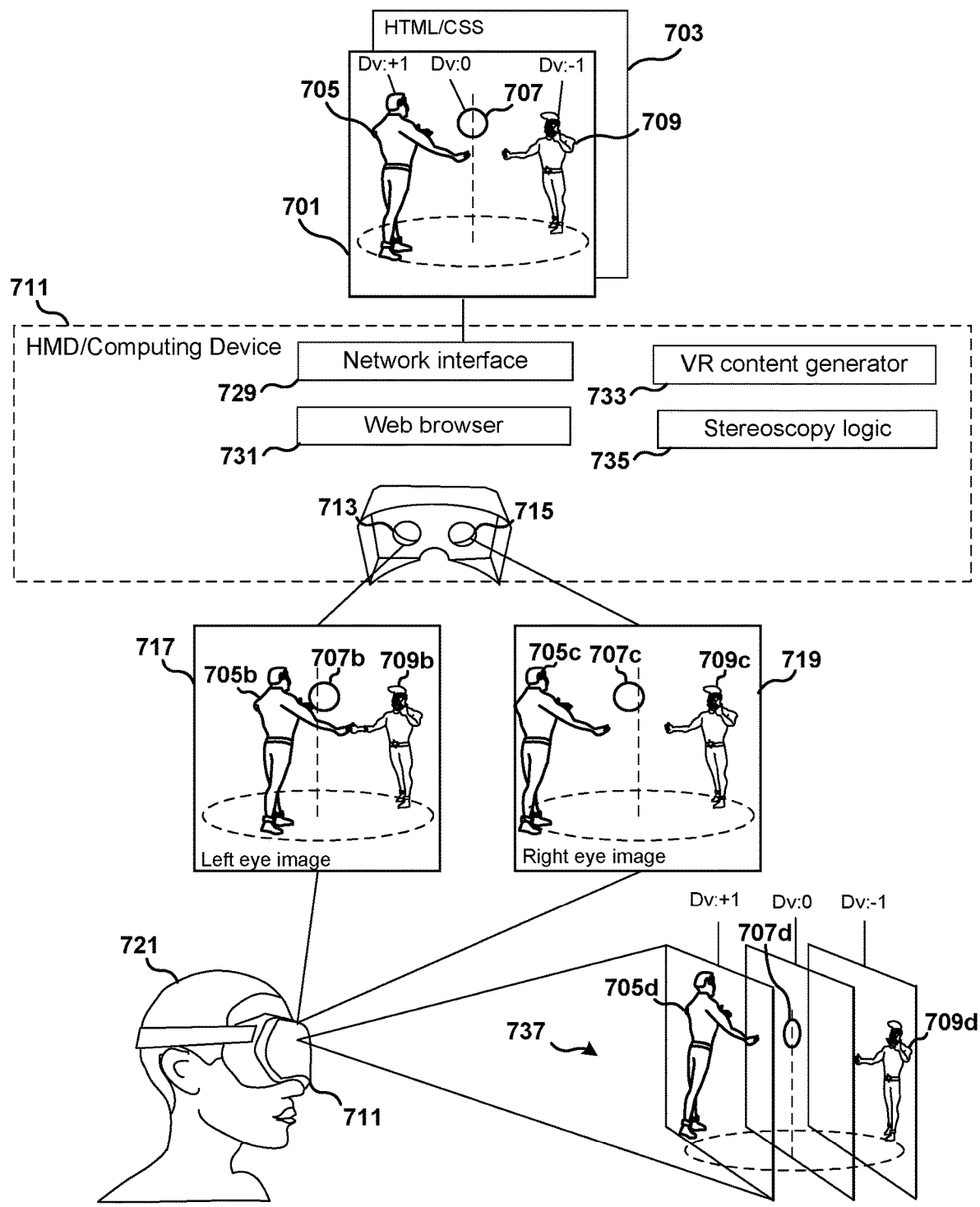
FIG. 7 shows a conceptual scheme for transforming a content item having objects with pre-assigned depth values into a stereoscopic 3D view of the content item via an HMD/Computing device.

FIG. 7 shows a conceptual scheme for transforming a content item 701 having objects 705, 707, and 709 with pre-assigned depth values into a stereoscopic 3D view 737 of the content item 701 via an HMD/Computing device 711. The content item 701 is shown to be defined by HTML code 703 that is retrievable by the HMD/computing device 711 via the Internet. The content item 701 includes an image of a hero 705 tossing a ball 707 to sidekick 709, wherein the hero 705 is shown to be assigned a depth value of +1, the ball a depth value of 0, and the sidekick a depth value of −1.

According to the embodiment shown in FIG. 7, HTML code 703 that defines display of content item 701 is shown to be received by HMD/computing device 711 via network interface 729. The HMD/computing device 711 is shown to include a web browser 731, which is configured to process HMTL code 703, including the depth values that are assigned to objects 705, 707, and 709, a VR content generator 733, and a stereoscopy logic 735. VR content generator 733 may, in some embodiments, be configured to display the web browser 731, in addition to other virtual reality elements. Further, the stereoscopy logic 735 may be configured to process the depth values defined within the HTML code 703 to render a left eye image 717 and right eye image 719 from the content item 701 according to the depth values. Moreover, HMD/computing device 711 is shown to include a left eye display 713 and right eye display 715 that are configured to display the left eye image 717 and the right eye image 719, respectively.

In other embodiments, the left eye display 713 and the right eye display 715 may be configured as a shutter system that allows one of the user's 721 eyes to be presented with respective left eye image 717 or right eye image 719 at a time.

According to some embodiments, the left eye display 713 will be caused by the stereoscopy logic 735 to display left eye image 717, having hero 705b that is stereoscopically shifted to the right a certain distance or number of pixels. At a similar time, the right eye image 719 being displayed by right eye display 715 will likewise have hero 705c shifted a certain distance or number of pixels, but in the opposite direction (e.g., to the left). Due to the horizontal shift of hero 705b and 705c in the left eye image 717 and right eye image 719, respectively, a parallax of hero 705 is provided to the user's 721 eyes. The stereoscopic logic likewise performs stereoscopic processing for ball 707 and sidekick 709 for the left eye image 717 and the right eye image 719. However, because ball 707 is assigned a lesser depth value that corresponds to a greater distance from the user 721, the stereoscopic shift of ball 707 in the left eye image 717 (ball 707b) and right eye image 719 (ball 707c) is to a lesser distance or fewer number of pixels than the stereoscopic shift made for hero 705. As a result, a parallax for the ball 707 is experienced by user 717 is to a lesser degree than that of hero 705. An even smaller stereoscopic shift is caused to happen for sidekick 709 in the left eye image 717 and the right eye image 719, resulting in a smaller parallax for sidekick 709. A circular boundary and vertical line segment at the origin of the circular boundary is provided in FIG. 7 for reference.

As the left eye image 717 and the right eye image 719 are delivered to user 721 via HMD 711, the user 721 is made to perceive a stereoscopic 3D view 737 of the content item 701. For example, hero 705d will be made to appear a depth that is closer than ball 707d, which in turn is made to appear at a depth that is closer than sidekick 709d. Hero 705d appears to be closest of the 3 objects within the content item 701 because of the larger stereoscopic shift or offset or displacement made between the left eye image 717 and right eye image 719, which causes hero 705d to be viewed with a greater degree of parallax. Generally speaking, humans with binocular vision (e.g., left and right eye) will perceive objects having greater parallaxes as being closer than objects having lesser parallaxes.

Figure 8:
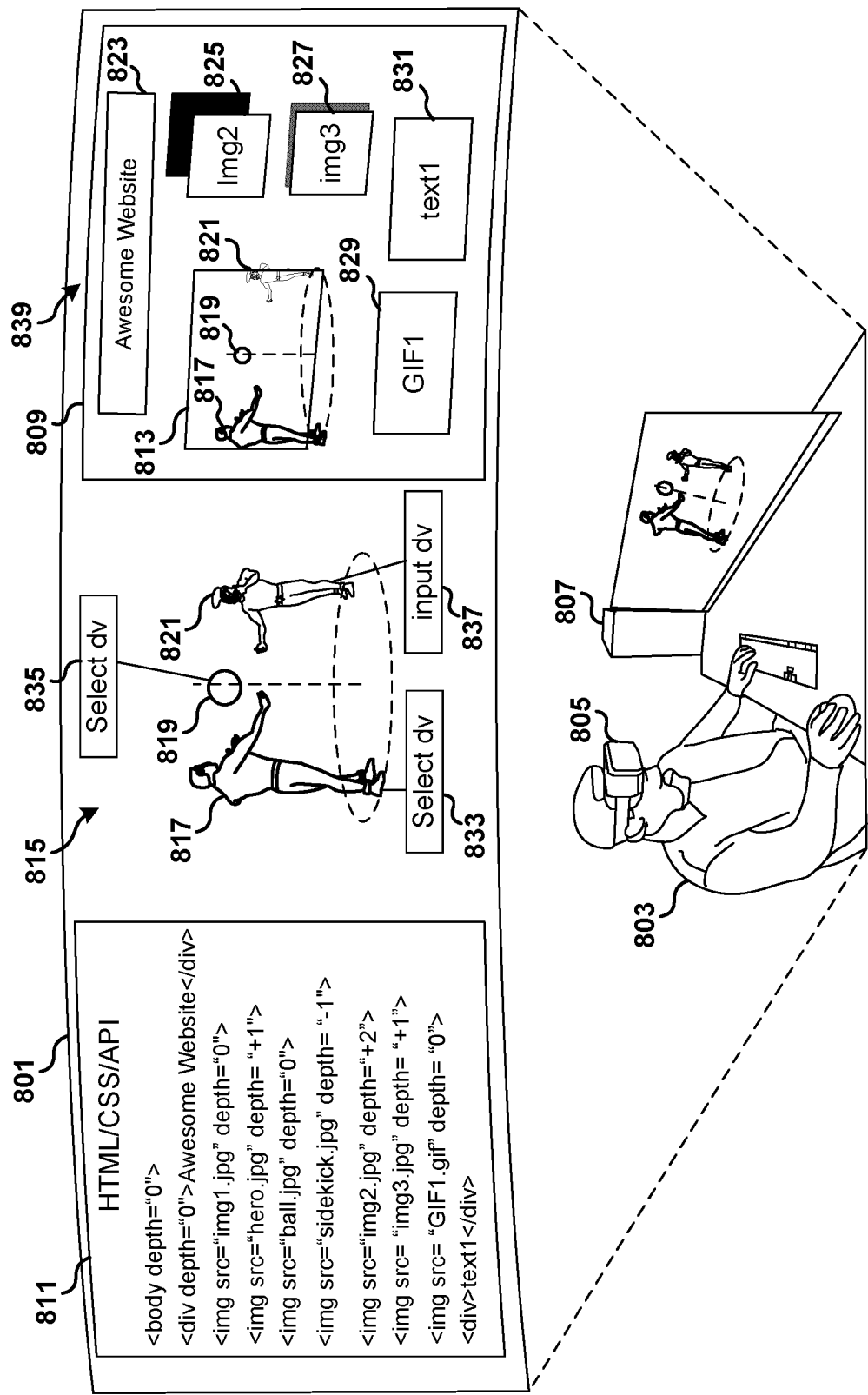
FIG. 8 shows an embodiment of a depth-keying platform/application programming interface that allows developers and content creators to manage depth properties of webpages within an HMD environment.

FIG. 8 shows an embodiment of an interface 801 that allows a developer 803 and other content creators to designate and manage depth properties of a webpage 809 within an HMD 805 environment. For example, developer 803 is shown to be presented with interface 801 while wearing HMD 805. The developer 803 is shown to be able to manage depth properties of a webpage 809 using a mouse and keyboard associated with a computer 807. In other embodiments, the computer 807 may be included by the HMD 805.

According to the embodiment shown in FIG. 8, the interface 801 includes a first module 811 for coding depth values for webpage 809, including depth values for the webpage 809 itself, a title 823, a first image 813, a second image 825, a third image 827, a GIF 829, and text 831. Also shown in the interface 801 is a second module 815 displaying the first image 813. The second module 815 may serve as an additional vehicle or interface to assign depth values to objects 817, 819, and 821. For example, second module 815 may include prompts 833, 835, and 837 for allowing developer 803 to assign depth values to objects 817, 819, and 821, respectively. It is contemplated that according to some embodiments, prompts 833, 835 and 837 may receive numerical inputs, or may be pull-down menus, or clickable menus, or the like.

According to the embodiment shown in FIG. 8, if the developer 803 is to assign a depth value to hero 817 via the first module 811 or via the second module 815, the developer is enabled to view the hero 817 in a 3D view appearing at a distance corresponding to the assigned depth value in real-time or near real-time via a third module 839 displaying the webpage 809. The same may be true of each of the content items featured in webpage 839, including the title 823, the second image 825, the third image 827, the GIF 829 and the text 831. Thus, according to some embodiments, the interface takes advantage of features of web content editors or programs related to 'what you see is what you get' (WYSIWYG), in addition to traditional HTML/CSS editors and programming IDEs.

Figure 9:
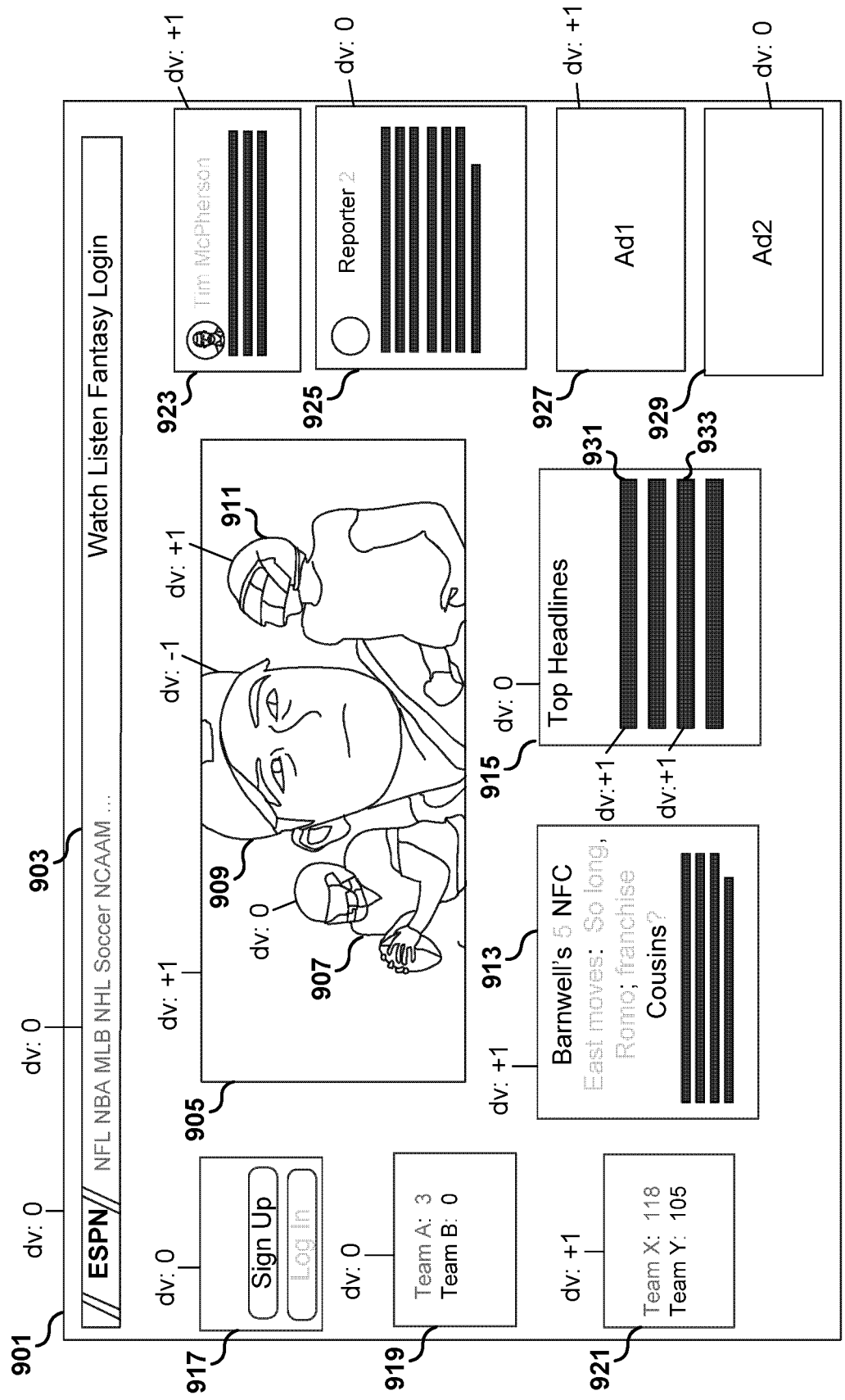
FIG. 9 shows an embodiment of a webpage having content items with pre-assigned depth values.

FIG. 9 shows an embodiment of a webpage 901 that is viewable via HMD having content items with pre-assigned depth values. In the embodiment shown, the webpage 901 is the homepage of ESPN.com, which includes a banner 903, a headlining image 905 with displayable objects Kirk Cousins 907, Tony Romo 909, and Victor Cruz 911, a headlining story 913, top headlines 915, as well as a Twitter feed having a first tweet 923 and second tweet 925, a first ad 927, a second ad 929, a sign-in module 917, a first score 919 between teams A and B, and a second score 921 between teams X and Y.

According to the embodiment shown in FIG. 9, the webpage is assigned a depth value of 0, and will be displayed with a depth accordingly within a 3D view provided by HMD. For some web developers and content creators, it is advantageous to have a headlining story or image displayed with more prominence. This prominence can be achieved with assigned depth values in addition to a size and space given to the headlining story or image within the webpage 901. For example, headlining image 905 is shown to have a depth value of +1, which will result in it being presented closer to a user viewing the webpage 901. Generally speaking, content items that are presented closer to a user generally will garner more attention than content items that are presented to appear farther away to the user.

In addition to headlining image 905 being presented to appear closer to the user, the headlining image 905 also includes objects 907-911 that are assigned different depth values. Thus, when presented to the user, the headlining image 905 will appear to be more dynamic and content-rich, having objects appearing at differing depths. For example, Victor Cruz 911 having a depth value of +1 will be presented closer to the user than either of Kirk Cousins 907 or Tony Romo 909. However, Tony Romo 909 is shown to occupy more pixels than either of Kirk Cousins 907 or Victor Cruz 911. Thus, headlining image 905 is able to feature both Tony Romo 909 and Victor Cruz 911 prominently in different ways.

According to the embodiment shown in FIG. 9, the headlining story 913 that accompanies and describes headlining image 905 is also assigned a depth value of +1, the same as that of the headlining image 905. For a user viewing webpage 901, both the headlining image 905 and the headlining story 913 will appear to pop out of the webpage 901 to a similar degree. As a result, the user is informed that the two are likely to be related, and is more likely to read the contents of headlining story 913 after looking at headlining image 905. Additionally, certain headlines such as a first head-line 931 and a second headline 933 of top headlines 915 are shown to have depth values of +1, which may be a result of an estimation that those particular headlines are of interest to the user. Moreover, the second score 921 will be made to appear closer (more prominent) to the user than the first score 919, which may be due to a calculation that the user is more interested in the game between teams X and Y than the game between teams A and B.

Also shown in the embodiment of FIG. 9 is a first tweet 923 having a depth value of +1. This may be a result of a user having greater historical interest in the tweeter Tim McPherson of the first tweet 923 than Reporter 2 of the second tweet 925 (which has a depth value of 0). Thus, in some embodiments, depth values may depend not only upon what developers assign, but also a profile of a user or member to a website, and data regarding the user's activities within the website and elsewhere (e.g., historical data, machine learned data, data obtained via APIs to social networks, etc.).

Further shown in FIG. 9 are the first ad 927 having a depth value of +1, and a second ad 929 having a depth value of 0. Due to their respective depth values, the first ad 927 will be displayed to the user at a closer distance. As a result, first ad 927 may be displayed with greater prominence than the second ad 929. Therefore, web developers may be enabled to present ads with varying degrees of prominence based on depth values assigned to each ad, wherein ad space with a higher depth value may cost more than ad space having a lower depth value.

Figure 10A:
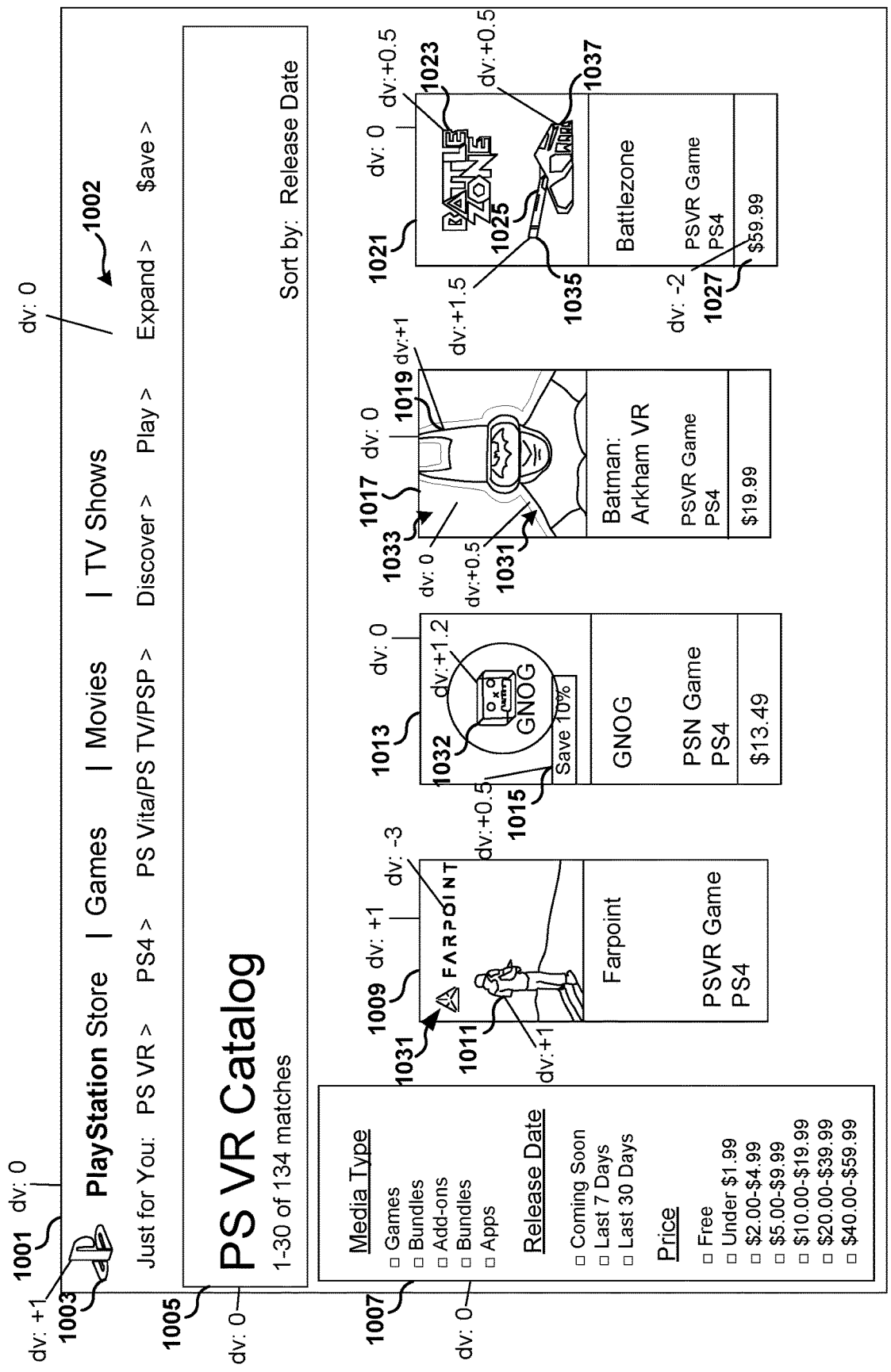
FIG. 10A shows an embodiment of an online game store having content items with pre-assigned depth values.

FIG. 10A shows an embodiment of an online game store 1001 having content items with pre-assigned depth values. The online game store 1001 includes a menu 1002 with a depth value of 0, a PlayStation® Logo 1003 with a depth value of +1, as well a plurality of options including "Games", "Movies", "TV Shows", "PS VR", etc. The online game store 1001 is also shown to include a banner 1005, a filter 1007, as well as a plurality of purchasable or downloadable game titles 1009, 1013, 1017, and 1021. Each game title is shown to include a game cover, which may include a title, an image, a discount badge, a metadata section, and a price. It is contemplated that each of these sections may be keyed with a depth value for some embodiments.

According to the embodiment shown, Farpoint 1009 is shown to have a depth value of +1, indicating that it will be presented to appear closer to HMD user. In contrast, GNOG 1013, Batman: Arkham VR 1017 and Battlezone 1021 will be made to appear at a depth corresponding to a depth value of 0. According to some embodiments, the online game store 1001 may be configured to feature Fairpoint 1009 with greater prominence than other titles, if, for example, it is a new release that is being promoted. Moreover, the content item for Farpoint 1009 is also shown to include a Farpoint title graphic 1031, and character 1011, which have depth values of −3 and +1, respectively. When Farpoint 1009 is delivered in a 3D view to a user of an HMD, the Farpoint 1009 will not only appear to pop-out prominently from the online game store 1001, it will also appear more engaging having a game cover with elements appearing at greatly different depths (e.g., the Farpoint title graphic 1031 is to appear far away, while character 1011 is to appear very close). Therefore, it is contemplated that having Farpoint title graphic 1031 to appear very far away adds prominence or appeal or congruence to the game title by having a semantic meaning or pragmatic meaning (e.g., 'a point that is far away') align with an implicit meaning derived from a depth property of the Farpoint title graphic 1031, (e.g., that the word "Farpoint" is made to appear far away). As a result, a prominence of content items and displayable objects can be both proportional to depth values, or inversely proportional to depth values (e.g., more negative depth values need not indicate lesser prominence).

Moreover, it is contemplated that content items having a greater extent of depth contrast (e.g., displayable objects at different depths) will tend to be more engaging to viewers due to a greater 3D effect and greater stimulation of visual-sensory systems of viewers (e.g., a user's visual cortex). As a result, developers are enabled to provide not only depth properties to content items within VR environments, but also depth contrast properties for those content items.

FIG. 10A also shows GNOG 1013 to have game cover including a graphic 1032 with a depth value of +1.2 and a discount badge 1015 with a depth value of +0.5, Batman: Arkham VR 1017 having a game cover Batman graphic 1019 with a depth value of +1, and Battle Zone 1021 having a game cover with title graphic 1023 at a depth value +0.5 and a tank 1025 at a depth value of +1.5. It is noted that Battle Zone 1021 also includes a price 127 of $59.99 at a depth value of −2, which may reflect a choice to not draw attention to the steep price of the game.

Also of note in the Batman: Arkham VR 1017 title of FIG. 10A is a transition area 1031 between Batman graphic 1019 having a depth value of +1 and a background 1033 having a depth of 0. It is contemplated that certain embodiments may display a transition region such as transition area 1031 having a depth value or depth gradient that is intermediate of the two regions that the transition area 1031 is transitioning between (e.g., between a depth value of +1 and a depth value of 0). This may be known as depth blending, in which a transition area serves to blend or make smoother the depth transition between displayable objects having varying depth properties.

In the embodiment shown in FIG. 10A, the transition area 1031 is shown to be defined by a depth value of +0.5. Accordingly, to a user viewing the Batman: Arkham VR 1017 title, the Batman graphic 1019 may be displayed at a distance that is closer than the background 1033 with a transition area 1031 that appears at a distance that is not as close as the Batman graphic 1019, but also not as far as the background 1033. As a result, the user is given a perception that there is a smoother transition (e.g., depth blending) between a plane in which the Batman graphic 1019 is presented and a plane which background 1033 is presented.

Although transition area 1031 is shown to have a depth value of +0.5, there are a number of depth values that transition 1031 can be assigned. Moreover, there can be a depth gradient associated with transition area 1031 in which the depth value at any given point or pixel within the transition area depends upon a location of the particular point or pixel. For example, points that are farther away from Batman graphic 1019 may be assigned depth values that are closer in value to the depth value of the background (e.g., dv: +0.1), whereas points that are closer to the Batman graphic 1019 within the transition area may be assigned depth values that are closer in value to that of the Batman graphic 1019 (e.g., dv: +0.9). As a result, the user may be given a perception that there is a smooth transition (e.g., depth blending) between Batman graphic 1019 and background 1033 by way of transition area 1031, according to some embodiments.

Also of note are the depth properties of tank 1025, which is shown to be a displayable object having more than one depth value. For example, tank 1025 is shown to have cannon 1035 with a depth value of +1.5 and a rear 1037 having a depth value of +0.5. In some embodiments, the tank 1025 will have a gradient of depth values ranging from +1.5 to +0.5 in order for it appear to a user to be 3-dimensional (e.g., tank 1025 appears to be approaching or advancing toward a user). In such embodiments with displayable objects having more than one depth value, the stereoscopy logic is configured to render a left eye image and a right eye image such that the displayable objects appear to have a gradient of depths in accordance with the pre-assigned gradient of depth values.

Figure 10B:
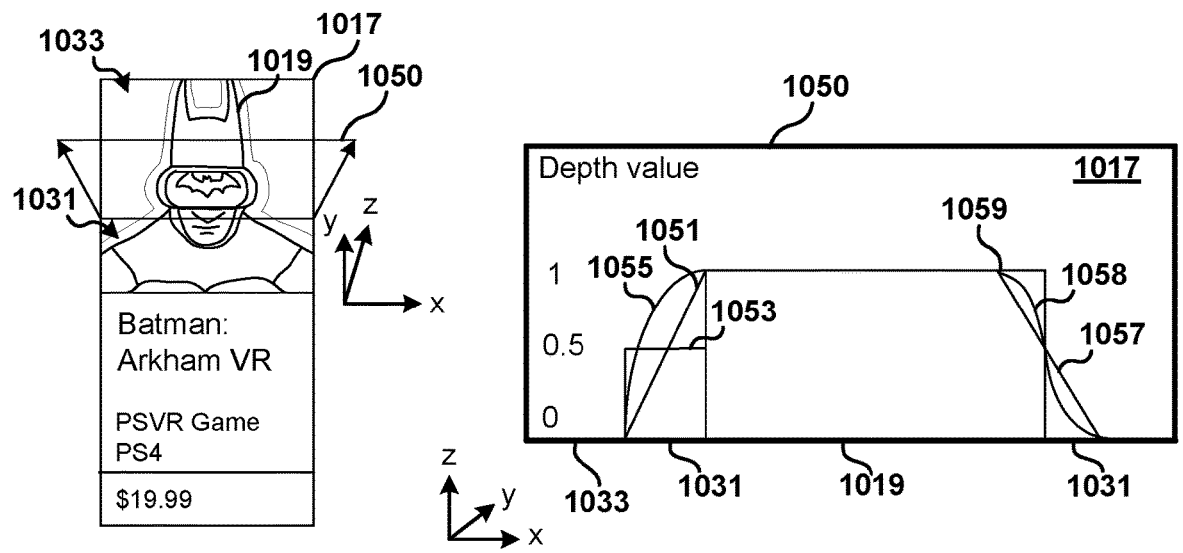
FIGS. 10B-C shows embodiments of depth blending of displayable objects or portions within displayable objects having different depth values using depth gradients.
Figure 10C:
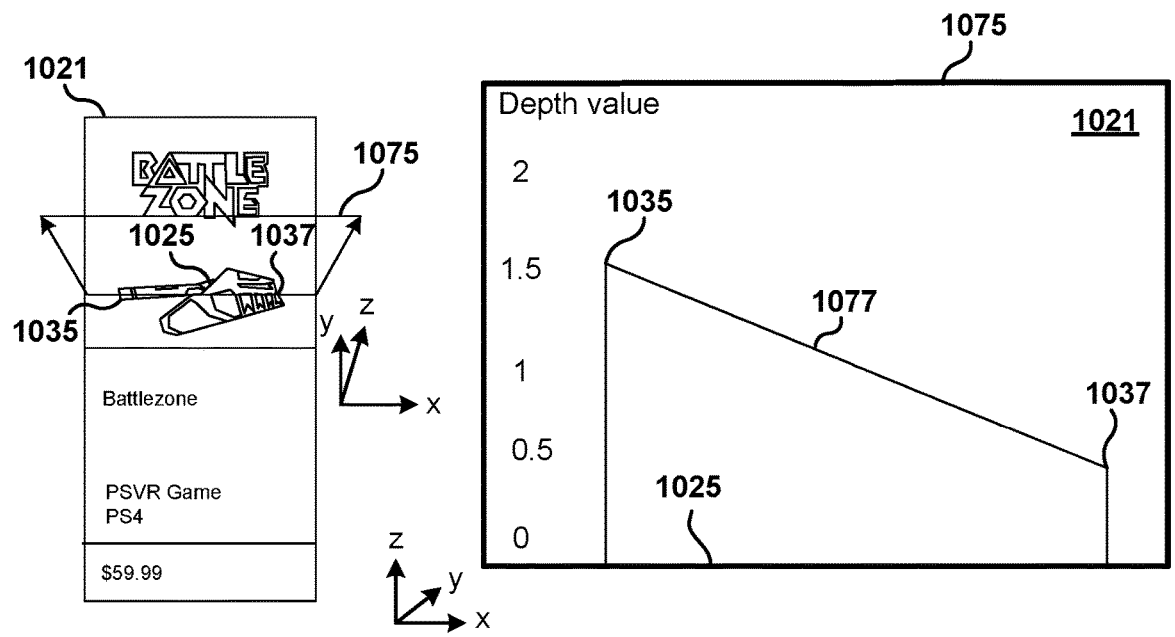

FIGS. 10B and 10C illustrate embodiments of depth gradients that may be used for a process of depth blending of displayable objects and transition areas between displayable objects. For example, FIG. 10B shows a cross-sectional view 1050 of Batman: Arkham VR 1017 having a Batman graphic 1019, a background 1033, and a transition area 1031 therebetween. Cross sectional view 1050 shows background 1033 with a depth value of 0 and a Batman graphic 1019 having a depth value of +1. Additionally, a number of depth gradients 1051-1057 are shown to be associated with transition area 1031. For example, a linear depth gradient 1051, a step depth gradient 1053, and a curved depth gradient 1055 are shown to transition between the background 1033 depth value of 0 up to the Batman graphic 1019 depth value of +1. Additionally, there is a linear depth gradient 1057 and a sigmoidal depth gradient 1058 that "bleeds into" the Batman graphic 1019 to a certain distance 1059, which may serve to extend the transition area into a displayable object. For example, linear depth gradient 1057 may have the Batman graphic 1019 appear at a distance associated with a depth value of +1, but begin to appear farther and farther away at distance 1059 that is associated with the depth gradient 1057. As a result, there is a depth blending between displayable objects that have different depth values that results in a 3-dimensional view having a smoother transition between Batman graphic 1019 and background 1033.

According to the embodiments described here, transition areas used for depth blending may be programmable by a web developer, or may be an automated process. Transition areas used for depth blending and depth gradients may span anywhere between about 1 pixel to about 100 pixels or more, depending on the embodiment. Moreover, while certain depth gradients have been shown as examples, there are any number of depth gradients that may be used with the method and system presented here to achieve a depth blending between displayable objects having different depth properties without departing from the scope of spirit of the embodiments.

Additionally, it is contemplated that certain embodiments may use cross-hatching, shadowing, feathering, detail allocation, pixilation, contouring, and so on to implement depth blending. As a result, a smoother, more natural transition is made to appear to the user between displayable objects having different depth values.

FIG. 10C shows a cross-sectional view 1075 of Battlezone 1021 having tank 1025 with a cannon 1035 at a depth value of +1.5 and a rear 1037 at a depth value of +0.5. In the embodiment shown, a web developer may be enabled to key portions of a displayable object with different depth values. For example, the developer may want the cannon 1035 to appear closer to the user than the rear 1037. According to certain embodiments, a depth gradient 1077 may be implemented to transition between the depth value of +1.5 and +0.5. Although the depth gradient 1077 is shown to be linear, it is contemplated that any number of depth gradients may be used in order to provide a depth blending between portions or points or segments of a displayable object having different depth values.

Figure 11:
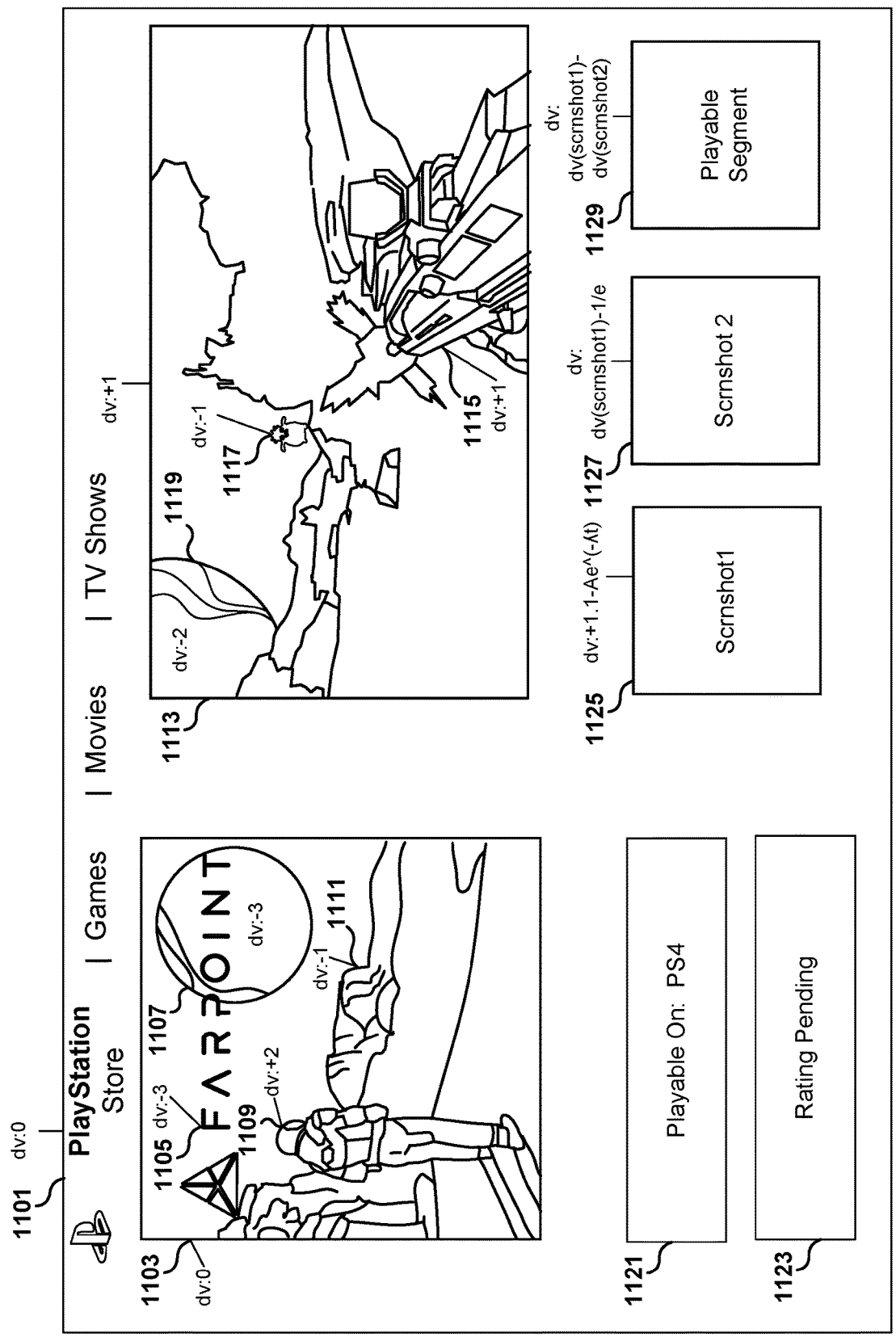
FIG. 11 shows an embodiment of a game page for a game title within an online store having content items and objects within content items with pre-assigned depth values.

FIG. 11 shows an embodiment of an online game page 1101 for Farpoint that may be accessible via an online game store, the online game page 1101 having content items and objects within content items with pre-assigned depth values. The online game page 1101 may be accessed via an online game store, for example by selecting the game Farpoint 1009 in the online game store 1001 in FIG. 10A. The online game page 1101 for Farpoint acts as a landing page for the game title, and includes a game cover 1103 with displayable objects 1105-1111, a media module 1113 with displayable objects 1115-1119, a platform compatibility specification 1121, a rating specification 1123, a first screen shot 1125, a second screen shot 1127, and a playable segment 1129.

As shown in FIG. 11 is the game cover 1103 that includes a Farpoint title graphic 1105 at a depth of −3, a celestial body 1107 at −3, a character 1109 at +2, and a mountain range 1111 at −1. When the game cover 1103 is displayed to an HMD user accessing the online game page 1101, both the celestial body 1107 and the Farpoint title graphic 1105 will appear a greater distance away than the other content items or displayable objects within the online game page 1101 due to their depth values of −3. In contrast, character 1109 will be made to appear closer than the other content items or displayable objects within the online game page 1101 by its having an assigned depth value of +2. As a result, the game cover 1103, instead of appearing flat or planar (as may be the case without the methods and systems for assigning and processing depth values for displayable objects), will be made to appear with a high degree of depth contrast as well as depth congruence. Depth contrast, which was explained earlier, for example, describes content with objects or regions at varying degrees of depth. For example, game cover 1105 will have objects that appear both close to the user as well as far away from the user.

It is further contemplated here that depth congruence may be a measure of how well the apparent depth of displayable objects within a content item matches or conforms to other visual and semantic cues that indicate or imply an object's depth. For example, character 1109 has a depth value of +2, which accords with other visual cues for its depth relative to other objects within the content item. The other visual cues that provide depth information for character 1109 to a viewer include the perspective given when viewing the character 1109, the size of character 1109, the level of detail or resolution rendered to character 1109, the shadows that character 1109 casts, foreshortening of character 1109, occlusion of other objects by character 1109, etc. Once a user is given these visual cues, he or she may be given a level of implicit depth information for character 1109 relative to other objects. When a user is provided with a 3D view of character 1109 that matches or conforms to the user's implicit depth information for character 1109, a level of depth congruence is provided. Depth congruence is likewise provided for Farpoint title graphic 1105, celestial body 1107, and mountain range 1111, all of which serves to provide a more engaging, realistic, and rich experience of the game cover 1103 and the online game page 1101 in general.

Also shown in FIG. 11 is a media module 1113 having displayable objects of a rifle 1115 at a depth value of +1, a monster 1117 at −1, and a moon 1119 at −2. The media module 1113 may include screen shots, video playback, live streams, promotional content, or a playable demo, etc. of the Farpoint game. As a result, a natural segue may be provided by media module 1113 between an online game page 1101 having information about the Farpoint game, and an experience of what it is like to actually play the Farpoint game. The online game page 1101 is also shown to include a first screen shot 1125, a second screen shot 1127, and a playable segment 1129, each of which may be selected to be instantiated within media module 1113. The depth value assigned to the first screen shot 1125 is shown to be a function of time t, which may reflect the length of time a user spends on online game page 1101 or directs a gaze at certain regions within the online game page 1101. The depth value assigned to the second screen shot 1127 is shown to be a function of the depth value of the first screen shot, and the depth value of the playable segment 1129 is shown to be a function of both the depth values of the first screen shot 1125 and the second screen shot 1127. Thus, it is contemplated that depth values need not be static, but can vary based on a number of parameters such as dwell times for a web page, a number of clicks made to the web page, the depth values of other content items or displayable objects, etc., according to some embodiments. Further, it is contemplated that non-static, dynamic depth values may be modified or manipulated at runtime or display time via associated code, e.g., JavaScript, ActionScript, etc., according to some embodiments.

Figure 12:
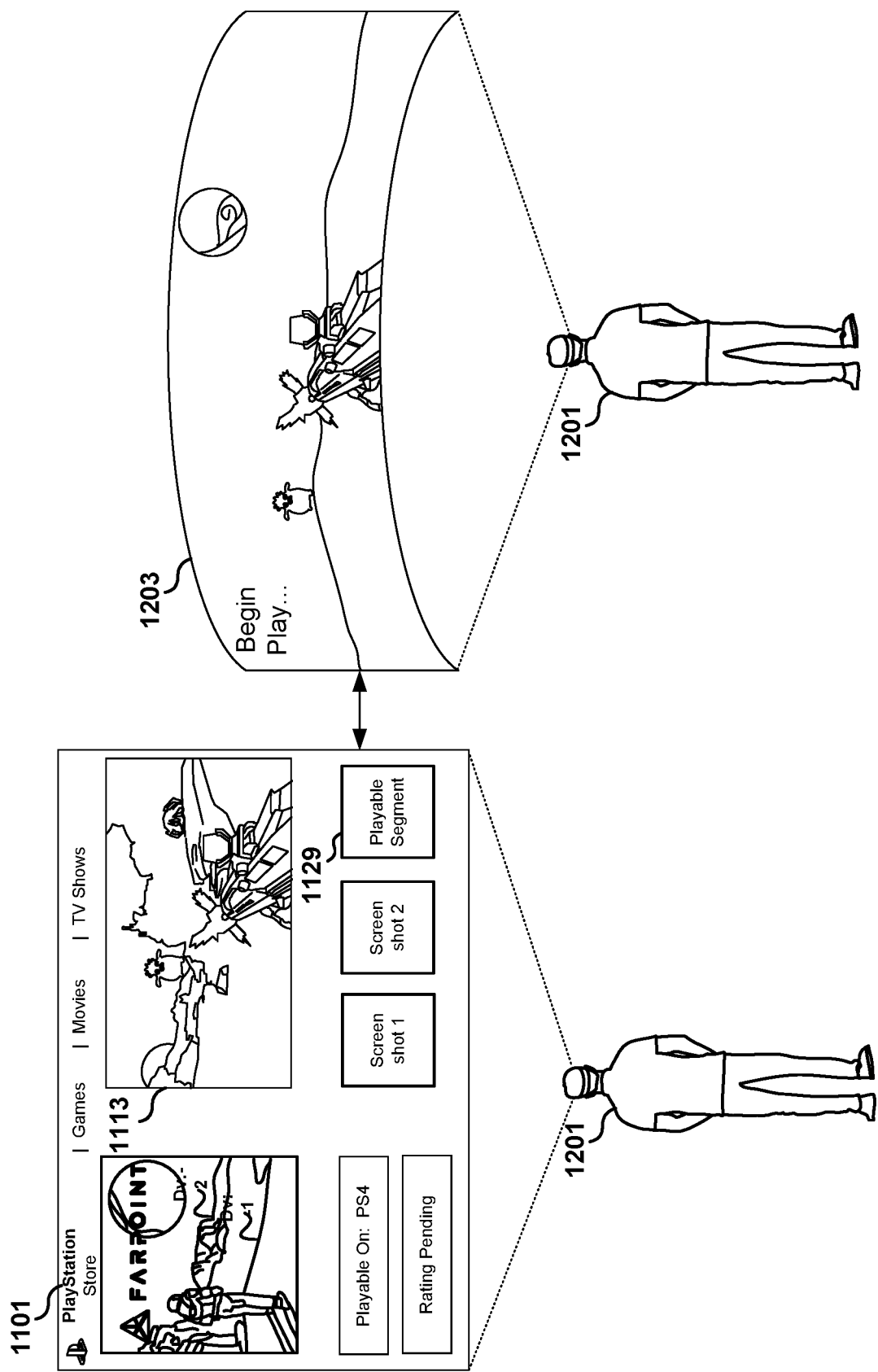
FIG. 12 shows an embodiment of an HMD user being transitioned from an online game page of an online game store to a corresponding VR scene.

FIG. 12 shows an embodiment that enables an HMD user 1201 to be transitioned from an online game page 1101 to a corresponding VR scene 1203. According to some embodiments, it is contemplated that in addition to viewing screen shots and video playback of a game title such as Farpoint, the HMD user 1201 may wish to demo the game. For example, the online game page 1101 may include an option such as playable segment 1129 that enables a transition between viewing the online game page 1101 to playing the game featured on the online game page 1101. Thus, it is contemplated that according to some embodiments, the HMD user may be transitioned from online game page 1101 to VR scene 1203 of the game featured by the online game page 1101. As a result, the HMD user 1201 is given a more natural segue into experiencing and demoing the game.

Figure 13:
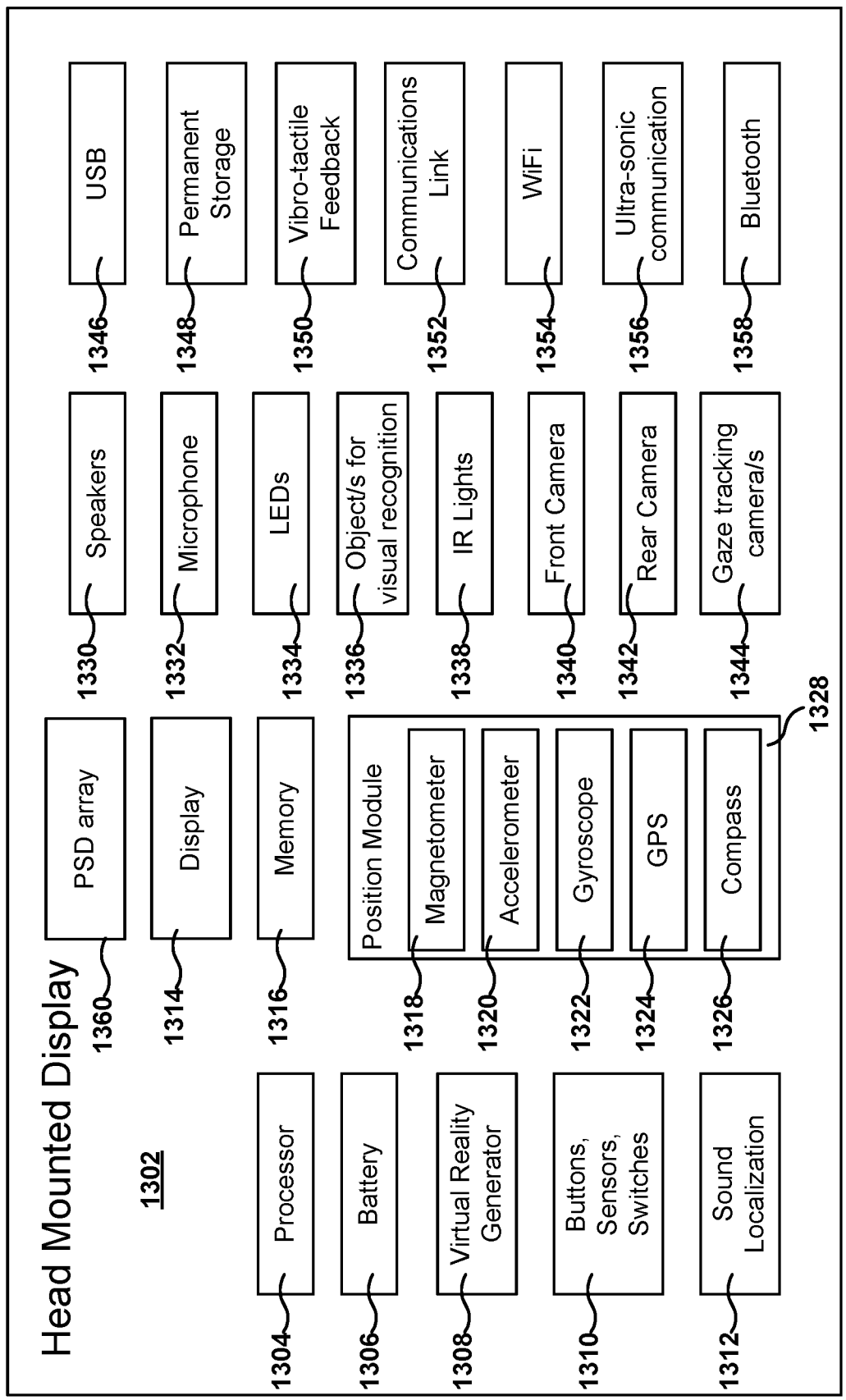
FIG. 13 illustrates and additional embodiment of an HMD that may be used with the presented method and/or system.

FIG. 13 illustrates an additional embodiment of an HMD 1302 that may be used with the presented method and/or system. HMD 1302 includes hardware such as a processor 1304, battery 1306, virtual reality generator 1308, buttons, sensors, switches 1310, sound localization 1312, display 1314, and memory 1316. HMD 1302 is also shown to include a position module 1328 that comprises a magnetometer 1318, an accelerometer 1320, a gyroscope 1322, a GPS 1324, and a compass 1326. Further included on HMD 1302 are speakers 1330, microphone 1332, LEDs 1334, object/s for visual recognition 1336, IR lights 1338, front camera 1340, rear camera 1342, gaze tracking camera/s 1344, USB 1346, permanent storage 1348, vibro-tactile feedback 1350, communications link 1352, WiFi 1354, ultra-sonic communication 1356, Bluetooth 1358, and photo-sensitive diodes (PSD) array 1360.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the changing of VR operations are performed in the desired way.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

What is claimed is:

1. A computer-implemented method for generating virtual reality (VR) content in a web browser, the web browser viewable through a head mounted display (HMD) of an HMD user, the method comprising:

accessing a webpage having content items, the content items being associated with one or more displayable objects selectively tagged with pre-assigned depth values that are selectable for activation in response to a field of view of the HMD user being pointed toward specific ones of the displayable objects;

detecting that the field of view of the HMD user is being pointed toward one or more of the displayable objects when viewing the webpage using the HMD;

identifying the respective pre-assigned depth values associated with the one or more displayable objects in the field of view of the HMD user, said pre-assigned depth values are defined to extend radially outward from a center of the field of view of the HMD user; and activating the pre-assigned depth values for the one or more displayable objects in the field of view of the HMD user for rendering a 3-dimensional view for the one or more displayable objects to appear on a display associated with the HMD based on the pre-assigned depth values of the one or more displayable objects, and tracking and changing the field of view of the HMD based on a determined position of the HMD, said activating the pre-assigned depth values includes rendering a right eye image and a left eye image such that the one or more displayable objects are stereoscopically shifted with respect to one another in the right eye image and the left eye image, wherein the right eye image is displayed in a right eye display of the display and the left eye image is displayed in a left eye display of the display wherein the one or more displayable objects that are viewable in the field of view of the HMD user are rendered at the pre-assigned depth values oriented along a radius from the center of the field of view of the HMD user.

2. The computer-implemented method of claim 1, wherein the pre-assigned depth values are configured to cause the one or more displayable objects to appear closer or farther away to the user of the HMD within the 3-dimensional view.

3. The computer-implemented method of claim 1, wherein said applying the pre-assigned depth values includes stereoscopically processing images for the left eye display of the HMD and the right eye display of the HMD.

4. The computer-implemented method of claim 1, wherein the webpage includes an online game store and the displayable objects are associated with one or more games.

5. The computer-implemented method of claim 4, wherein the online game store includes an option to enter into a VR scene associated with specific ones of the one or more games.

6. The computer-implemented method of claim 1, wherein the one or more content items include stories, pages, tabs, articles, pictures, videos, posts, snaps, or content from a newsfeed.

7. The computer-implemented method of claim 1, wherein the one or more displayable objects include portions or subsets of content within the one or more content items.

8. The computer-implemented method of claim 1, wherein a greater pre-assigned depth value is configured to render an associated displayable object to appear closer to the HMD user and a lesser pre-assigned depth value is configured to render an associated displayable object to appear farther away from the HMD user.

9. The computer-implemented method of claim 1, wherein the pre-assigned depth values are applied when the field of view of the HMD user is at least partially directed to the one or more content items having the one or more displayable objects associated with the pre-assigned depth values.

10. The computer-implemented method of claim 1, wherein the one or more content items also are associated with respective pre-assigned depth values.

11. The computer-implemented method of claim 1, wherein the pre-assigned depth values are configured to be assignable using an HTML/CSS editor or a what you see is what you get (WYSIWYG) editor.

12. The computer-implemented method of claim 1, wherein the webpage is further configured to be assigned a depth value.

13. The computer-implemented method of claim 1, wherein the pre-assigned depth values are dynamic or static values during said accessing the webpage.

14. The computer-implemented method of claim 1, wherein the pre-assigned depth value for a displayable object is relative to the pre-assigned depth value of a content item that is inclusive of the displayable object.

15. The method of claim 1, wherein said applying the pre-assigned depth values to the one or more displayable objects in the one or more content items occurs for an entirety of the webpage.

16. The computer-implemented method of claim 1, wherein the displayable objects that are not selectively tagged with the pre-assigned depth values are not activated when the field of view of the HMD user is being pointed toward said displayable objects that were not selectively tagged.

17. The computer-implemented method of claim 1, wherein the field of view of the HMD user is determined by one or a combination of eye gaze tracking of the HMD user and an inertial sensor of the HMD that provides information regarding the field of view of the HMD.

18. The computer-implemented method of claim 1, wherein the pre-assigned depth values are numeric positive or negative values that dynamically apply a distance for said displayable objects that were selectively tagged, said selective tagging is applied to a two-dimensional webpage to augment said displayable objects that were selectively tagged.

19. A system for rendering a 3-dimensional view of web content, comprising:
   a left eye display;
   a right eye display;
   a network interface for accessing a webpage having displayable objects, the displayable objects selectively tagged with pre-assigned depth values that are selectable for activation in response to a field of view of the HMD user being pointed toward specific ones of the displayable objects, said pre-assigned depth values are defined to extend radially outward from a center of the field of view of the HMD user;
   a computing device for detecting that the field of view of the HMD user is being pointed toward one or more of the displayable objects when viewing the webpage using the HMD, said computing device further activating the pre-assigned depth values for the one or more displayable objects in the field of view of the HMD user and tracking and changing the field of view of the HMD based on a determined position of the HMD, said computing device further processing data associated with the webpage, the computing device including a web browser for displaying the webpage, the computing device further including a stereoscopy logic for processing the respective pre-assigned depth values for the displayable objects for rendering a right eye image to be displayed on the right eye display and a left eye image to be displayed on the left eye display based on the pre-assigned depth values of the one or more displayable objects, wherein the left eye display and the right eye display provides a 3-dimensional view of the displayable objects when a user views the left eye display with a left eye and the right eye display with a right eye, wherein the left eye image and the right eye image includes the displayable objects that have been stereoscopically shifted according to the respective pre-assigned depth values
   wherein the one or more displayable objects that are viewable in the field of view of the HMD user are rendered at the pre-assigned depth values oriented along a radius from the center of the field of view of the HMD user.

20. The system of claim 19, wherein a greater pre-assigned depth value causes a greater extent of stereoscopic shift for a displayable object, and a lesser pre-assigned depth value causes a lesser stereoscopic shift for a displayable object.

21. The system of claim 19, wherein a greater pre-assigned depth value causes a displayable object to appear closer within the 3-dimensional view and a lesser pre-assigned depth value causes a displayable object to appear farther away within the 3-dimensional view.

22. The system of claim 19, wherein said stereoscopy logic processes the respective depth values for the displayable objects for an entirety of the webpage.

23. The system of claim 19, wherein the displayable objects that are not selectively tagged with the pre-assigned depth values are not activated when the field of view of the HMD user is being pointed toward said displayable objects that were not selectively tagged.

24. The system of claim 19, wherein the field of view of the HMD user is determined by one or a combination of eye gaze tracking of the HMD user and an inertial sensor of the HMD that provides information regarding the field of view of the HMD.

25. The system of claim 19, wherein the pre-assigned depth values are numeric positive or negative values that dynamically apply a distance for said displayable objects that were selectively tagged, said selective tagging is applied to a two-dimensional webpage to augment said displayable objects that were selectively tagged.

26. A computer-implemented method for generating virtual reality (VR) content in a web browser, the web browser viewable through a head mounted display (HMD) of an HMD user, the method comprising:
   accessing a webpage having content items, the content items being associated with one or more displayable objects selectively tagged with pre-assigned depth values that are selectable for activation in response to a field of view of the HMD user being pointed toward specific ones of the displayable objects;
   detecting that the field of view of the HMD user is being pointed toward one or more of the displayable objects when viewing the webpage using the HMD;
   identifying the respective pre-assigned depth values associated with the one or more displayable objects in the field of view of the HMD user, said pre-assigned depth values are defined to extend radially outward from a center of the field of view of the HMD user; and
   activating the pre-assigned depth values for the one or more displayable objects in the field of view of the HMD user for rendering a 3-dimensional view for the one or more displayable objects to appear on a display associated with the HMD based on the pre-assigned depth values of the one or more displayable objects, and tracking and changing the field of view of the HMD based on a determined position of the HMD, wherein the tracking is facilitated by inertial sensor data from the HMD wherein the one or more displayable objects that are viewable in the field of view of the HMD user are rendered at the pre-assigned depth values oriented along a radius from the center of the field of view of the HMD user.

* * * * *